United States Patent

Matsumura

[11] Patent Number: 5,937,805
[45] Date of Patent: Aug. 17, 1999

[54] APPARATUS AND METHOD FOR CONTROLLING VALVE TIMING OF ENGINE

[75] Inventor: Tatsuo Matsumura, Atsugi, Japan

[73] Assignee: Unisia Jecs Corporation, Atsugi, Japan

[21] Appl. No.: 09/002,708

[22] Filed: Jan. 5, 1998

[30] Foreign Application Priority Data

Jan. 7, 1997 [JP] Japan ..................................... 9-012030
Jan. 7, 1997 [JP] Japan ..................................... 9-012032

[51] Int. Cl.$^6$ ....................................................... F01L 13/00
[52] U.S. Cl. ..................................... 123/90.15; 123/90.17; 123/90.31
[58] Field of Search ............................. 123/90.15, 90.17, 123/90.31

[56] References Cited

U.S. PATENT DOCUMENTS

| 4,928,640 | 5/1990 | van Vuuren et al. | 123/90.17 |
| 5,363,817 | 11/1994 | Ikeda et al. | 123/90.17 |
| 5,417,187 | 5/1995 | Meyer et al. | 123/90.17 |
| 5,462,022 | 10/1995 | Ushida | 123/90.17 |
| 5,522,352 | 6/1996 | Adachi et al. | 123/90.17 |
| 5,553,573 | 9/1996 | Hara et al | 123/90.17 |
| 5,636,603 | 6/1997 | Nakamura et al. | 123/90.17 |

FOREIGN PATENT DOCUMENTS

| 6-2516 | 1/1994 | Japan . |
| 2 267 949 | 12/1993 | United Kingdom . |
| 2 286 261 | 8/1995 | United Kingdom . |

OTHER PUBLICATIONS

Patent Abstract of Japan 07019073, Jan. 20,1995.

*Primary Examiner*—Weilun Lo
*Attorney, Agent, or Firm*—Foley & Lardner

[57] ABSTRACT

In an apparatus for variably controlling valve timing of engine by generating, between a crankshaft and a cam shaft, a phase difference which periodically varies in a manner synchronized with a rotational phase of the cam shaft: actual phase differences are obtained at two discrete rotational phases of the cam shaft, respectively; there is assumingly calculated an amount of deviation (phase deviation θ) of phase difference relative to the rotational phase of the cam shaft; and the phase difference is feedback controlled based on that value of the detected phase difference which is corrected in accordance with the amount of deviation (phase deviation θ).

12 Claims, 15 Drawing Sheets

APPARATUS AND METHOD FOR CONTROLLING VALVE TIMING OF ENGINE

FIELD OF THE INVENTION

The present invention relates to apparatus and method for controlling valve timing of engine, in which opening and closing timing of intake valves and/or exhaust valves is variably controlled in response to operating conditions of engine.

RELATED ART OF THE INVENTION

There has been known an apparatus for controlling valve timing of engine, in which opening and closing timing of intake valves and/or exhaust valves is variably controlled in response to operating conditions of engine (see Japanese Unexamined Patent Publication No.6-2516).

As examples of the aforementioned apparatus for controlling valve timing, there can be mentioned such as one which varies opening and closing timing by varying a phase difference between rotational phases of a crankshaft and a cam shaft, and one which variably controls valve timing by periodically varying the aforementioned phase difference in a manner synchronized with a rotational phase of a cam shaft and by variably controlling an amplitude of the periodical phase difference variation.

Further, in those which variably control the phase difference as mentioned above, there may be effected a feedback control such that an actual phase difference is rendered to become consistent with a target value, by detecting the actual phase difference based on detection signals from a crankshaft angle sensor and a cam shaft position sensor.

Meanwhile, since the crankshaft and cam shaft are mechanically connected to each other such as via timing belt, there may occur looseness or deflection about their connecting parts.

When there occurs such as deflection of a timing belt, the generation timings of detection signals of crank angle sensor and cam position sensor deviate from each other. If this occurs in the aforementioned valve timing controlling apparatus in which the phase difference is periodically varied, the characteristics of phase difference relative to the rotational phase of cam shaft is wholly deviated due to the deviation of generation timing of the detection signals, resulting in detection of such a phase difference that includes this deviated amount (hereinafter which may be called "phase deviation"). Thus, it becomes impossible to feedback control the phase difference with accuracy, causing a problem that the opening and closing timing of valve can be no longer varied appropriately.

SUMMARY OF THE INVENTION

The present invention has been carried out in view of the aforementioned problems in the conventional technique, and it is therefore an object of the present invention to provide apparatus and method for controlling valve timing of engine, which are constituted to periodically vary a rotational phase difference between a rotational phase of crankshaft and that of cam shaft in a manner synchronized with the rotational phase of the cam shaft, in which a correct phase difference can be detected with accuracy even when a deviation has occurred between generation timings of detection signals of the rotational phases due to such as deflection of the timing belt, so that the phase difference (opening and closing timing) can be feedback controlled with high accuracy.

To achieve the above object, in the apparatus and method for controlling valve timing of engine according to the present invention: an actual phase difference occurred between the crankshaft and cam shaft is detected when the rotational phase of the cam shaft has reached previously set first and second rotational phases, respectively; and a phase deviation, which is a deviated amount of the phase difference relative to the rotational phase of the cam shaft, is arithmetically obtained based on the thus detected actual phase difference. Further, it is constituted that the detected value of phase difference is corrected in response to the phase deviation, and is used for the feedback control.

According to such a constitution, the deviated amount of the phase difference relative to the rotational phase of cam shaft can be evaluated by obtaining phase differences at two discrete rotational phases, since the phase difference will periodically vary in a manner synchronized with the rotational phase of the cam shaft. Namely, it is difficult to detect and extract the deviated amount only, since the detected value of phase difference at one rotational position includes the amplitude variance of periodically varying phase difference in addition to the aforementioned deviated amount. Nonetheless, by detecting the phase difference at predetermined two discrete rotational phases, it becomes possible to detect the deviated amount only, based on or making use of the relative relationship between these phase differences.

It is preferable that the first rotational phase is defined as a rotational position which is shifted forwardly of the rotational phase by a fixed degree of angle relative to the rotational position of the cam shaft at which position the phase difference becomes zero when the phase deviation is zero, and the second rotational phase is defined as a rotational position which is shifted backwardly of the rotational phase by the fixed degree of angle relative to the rotational position of the cam shaft.

According to such a constitution, the phase difference is detected at two rotational phase positions which are separated by the same angle forwardly and backwardly from a position at which the phase difference is to become zero. Thus, it becomes possible to detect the phase difference at two positions at which phase differences having opposite signs and same absolute values are to be detected, so that the deviated amount can be assumed or predicted as the difference between these absolute values.

Further, it is advantageous that the fixed degree of angle is an angle which corresponds to maximal and minimal positions of the phase difference.

According to such a constitution, the phase difference can be precisely detected so that the phase deviation can be detected with high accuracy, since the variance gradient of phase difference is relatively small or flat in the vicinity of the maximal and minimal positions.

It is also preferable to assumingly calculate, based on a plurality of phase differences detected in a time series manner in one of the first and second rotational phases, the phase difference in the other of the first and second rotational phases, and calculate the phase deviation, based on the thus assumingly calculated phase difference and on the phase difference actually detected in the other of the first and second rotational phases.

According to such a constitution, the phase deviation can be obtained with good accuracy, even when the amplitude of phase difference is being varied.

It is also possible that, when the phase difference is constituted to be varied based on an operating amount corresponding to the target phase difference, an actual value of the operating amount is obtained based on the phase difference corrected by the phase deviation, and the feedback control is performed such that this actual value becomes the operating amount corresponding to the target phase difference.

According to such a constitution, the feedback control can be performed with high accuracy, since the operating amount, which is required for rendering the actual phase difference to be consistent with the target phase difference, can be obtained quantitatively.

It is advantageous to constitute that a variance rate is to be arithmetically obtained with respect to the detected results of phase difference, and an updating calculation of the phase deviation is inhibited when this variance rate of phase difference has exceeded an allowable limit.

According to this constitution, when the phase difference has varied so largely that the calculation precision of phase deviation can not be ensured, it is inhibited to updatingly calculate the phase deviation based on the largely varying phase difference. The correction is performed, for example, based on that phase deviation which has been calculated before the phase difference varies largely.

Further objects and details of the present invention will become more apparent from the following description of the preferred embodiments of the present invention when read in conjunction with the accompanying drawings.

PREFERRED EMBODIMENTS

Figure 1:
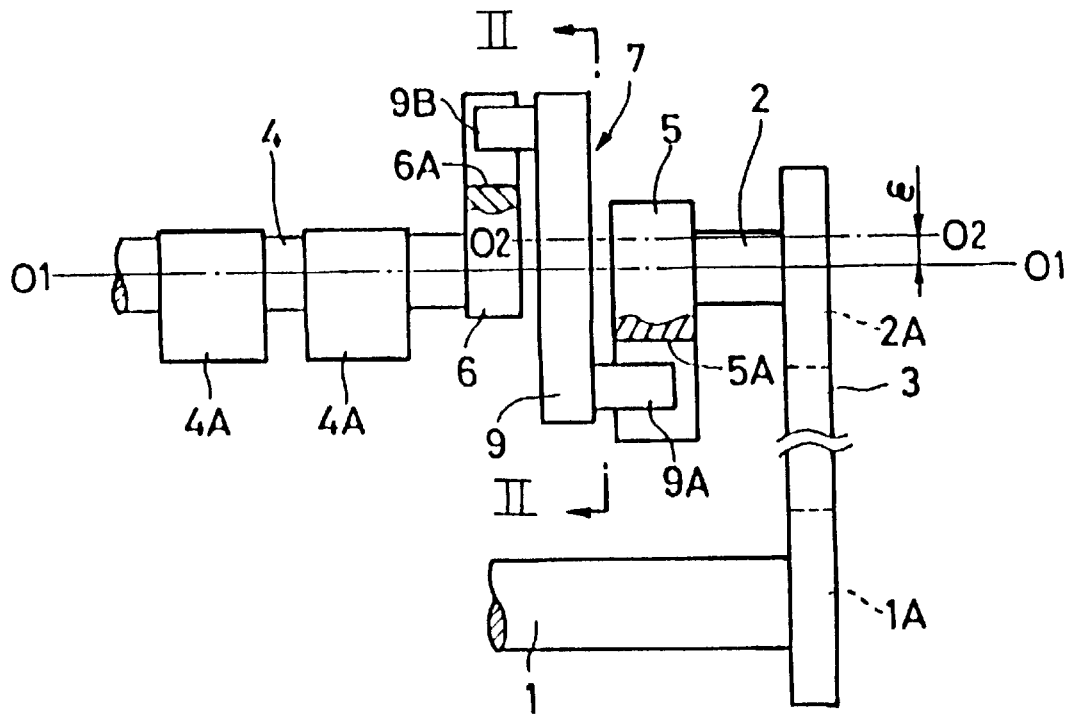
FIG. 1 is a partially sectional front view of a control apparatus for controlling valve timing of engine according to a preferred embodiment of the present invention.

The preferred embodiments of the present invention will be described hereinafter.

FIGS. 1 to 6 show an apparatus for controlling valve timing of engine, according to the embodiment of the present invention.

In these figures, reference numeral 1 designates a crankshaft of an engine, which is integrally mounted with a small diameter pulley 1A at one end thereof. Further, the crankshaft 1 is provided with a crank angle sensor 11 for detecting a rotational phase a of the former, as explained later.

Further provided is a drive shaft 2 for transmitting a rotational driving force of the crankshaft 1 to a cam shaft 4 noted later. This drive shaft 2 is provided rotatably about an axis O1—O1 on an engine body side, and has a large diameter pulley 2A interconnected to the small diameter pulley 1A of crankshaft 1 such as via a timing belt 3.

The cam shaft 4, for opening and closing the intake valves (not shown) at each cylinders, is provided on the engine body side in a manner rotatable about the axis O1—O1. The rotational phase β of shaft 4 is detected by a cam position sensor 12 to be noted later. The cam shaft 4 is driven by the crankshaft to rotate such as via the drive shaft 2 and an eccentric disk 9 to be noted later. When its rotational phase β has become a predetermined value to be determined based on the suction stroke of each cylinder, the shaft 4 opens and closes appropriate ones of intake valves by the cams 4A, 4A.

There is further provided a connecting plate 5, which is provided at the other end of the drive shaft 2 to be rotated integrally therewith, and connects the drive shaft 2 to the eccentric disk 9. This connecting plate 5 is formed with a radially extending engagement groove 5A into which an engaging pin 9A of the eccentric disk 9 is engaged.

Provided at one end of the cam shaft 4 is another connecting plate 6 which is formed with a radially extending engagement groove 6A into which another engaging pin 9B of the eccentric disk 9 is engaged.

Figure 2:
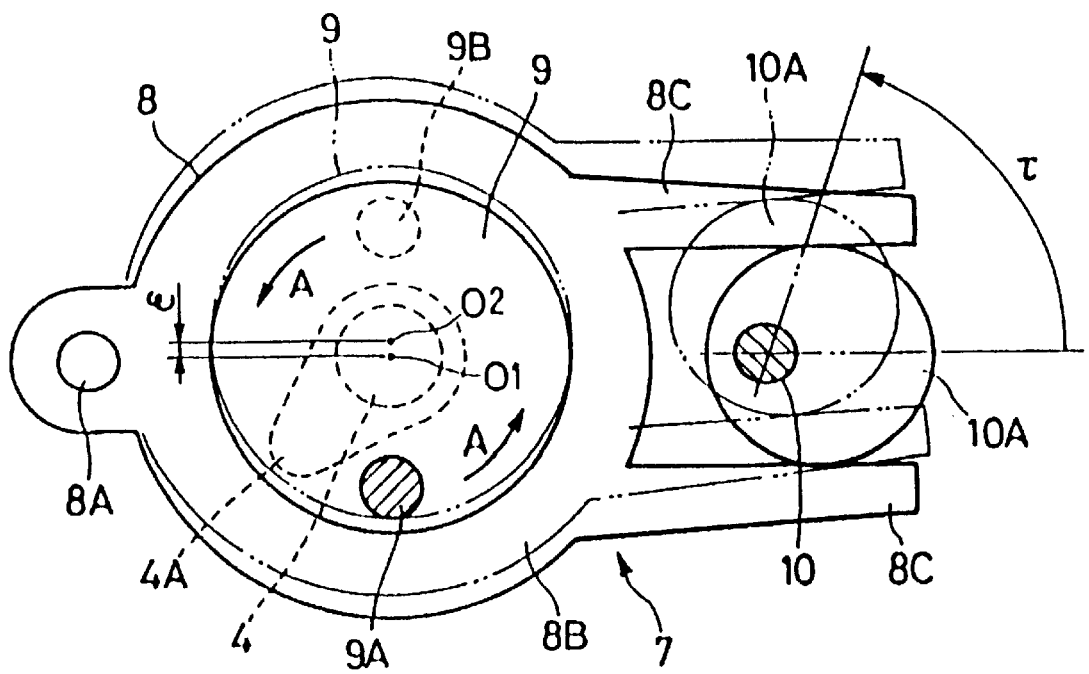
FIG. 2 is a sectional view taken along an arrow II—II in FIG. 1, showing an eccentric disk such as together with a control shaft.

Reference numeral 7 designates an eccentric mechanism, functioning as rotational phase varying means for varying the opening and closing timing of each of intake valves. As shown in FIG. 2, the eccentric mechanism 7 is constituted of a disk holder 8 to be noted later, the eccentric disk 9, a control shaft 10, and driving means such as electromagnetic actuator.

The eccentric mechanism 7 shifts the rotational phase β of the cam shaft 4 relative to the rotational phase a of the crankshaft 1 as noted to be later, by shifting a center O2 of the eccentric disk 9 relative to a center O1 of the cam shaft 4 by an eccentricity amount ε, to thereby generate a phase difference Φ between the rotational phases α and β.

Reference numeral 8 is the disk holder 8 in which the eccentric disk 9 is rotatably received, and is constituted of an annular part 8B having one end swingably mounted to the engine body via a fixing pin 8A, and a pair of engaging pawls 8C, 8C integrally formed at the other end of the annular part 8B.

The eccentric disk 9 connects the drive shaft 2 to the cam shaft 4, and has the engaging pin 9A projectingly formed at one side thereof and the engaging pin 9B projectingly formed at the other side thereof, as shown in FIG. 1. These engaging pins 9A and 9B are provided at the radially opposite and corresponding positions with respect to the center O2 of the eccentric disk 9, as shown in FIG. 2.

The eccentric disk 9 is accommodated within the annular part 8B of the disk holder 8, in a manner rotatable about an axis O2—O2, and the engaging pins 9A and 9B are slidably engaged in the engaging grooves 5A and 6A of the connecting plates 5 and 6, respectively. By this arrangement, the drive shaft 2 and cam shaft 4 are interconnected to each other via the connecting plates 5 and 6 and the eccentric disk 9. In this state between the connecting plates 5 and 6, the eccentric disk 9 is permitted to move radially of the cam shaft 4 (drive shaft 2).

The control shaft 10, for controlling the eccentricity of the eccentric disk 9, is rotatably provided on the engine body, and has a cam 10A slidably disposed between the engaging pawls 8C and 8C of the disk holder 8. As shown by a double-dotted line in FIG. 2, this control shaft 10 is rotated by the aforementioned electromagnetic actuator so as to swing the disk holder 8 together with the eccentric disk 9 about the fixing pin 8A.

Based on the above, the eccentric mechanism 7 provides the eccentric disk 9 with an eccentricity amount $\epsilon$ corresponding to a rotational angle $\tau$ (operating amount) of the control shaft 10, so that the phase difference $\Phi$ corresponding to the eccentricity amount $\epsilon$ is generated between the rotational phase $\alpha$ of the crankshaft 1 and the rotational phase $\beta$ of the cam shaft 4.

Figure 3:
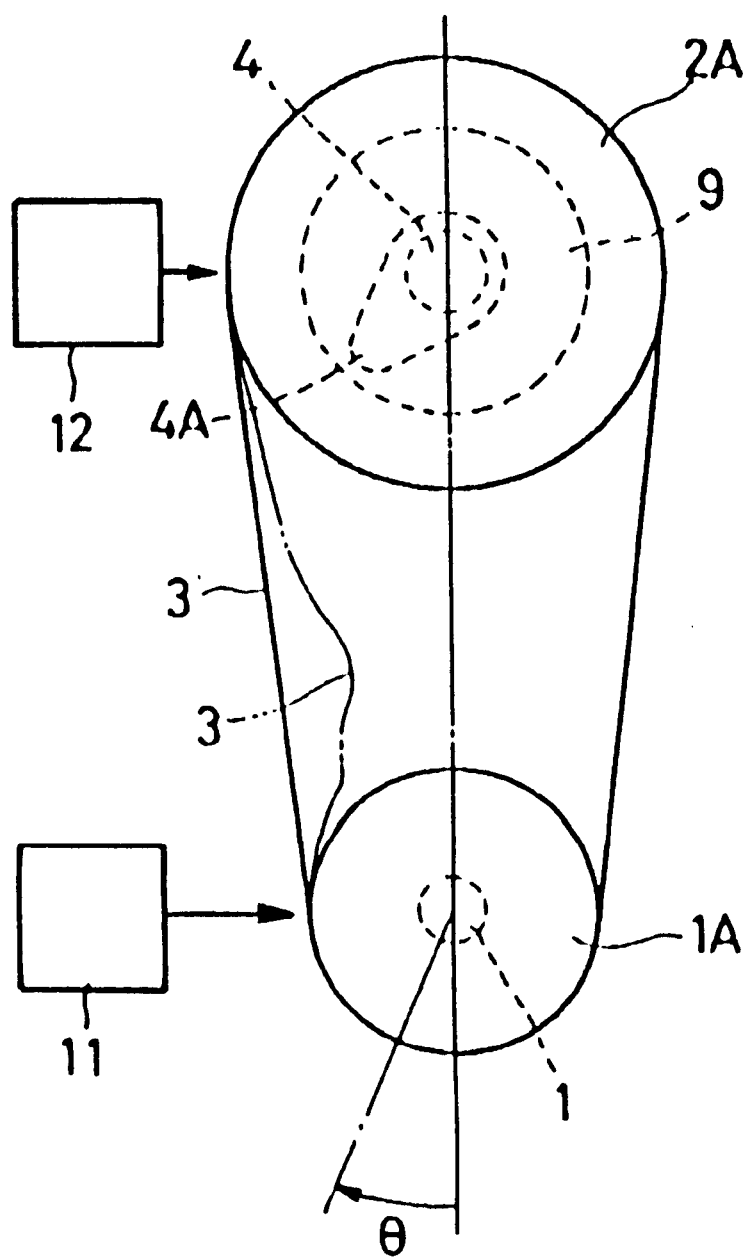
FIG. 3 is a right side view of FIG. 1, showing such as crankshaft, cam shaft, crank angle sensor, and cam position sensor.
Figure 4:
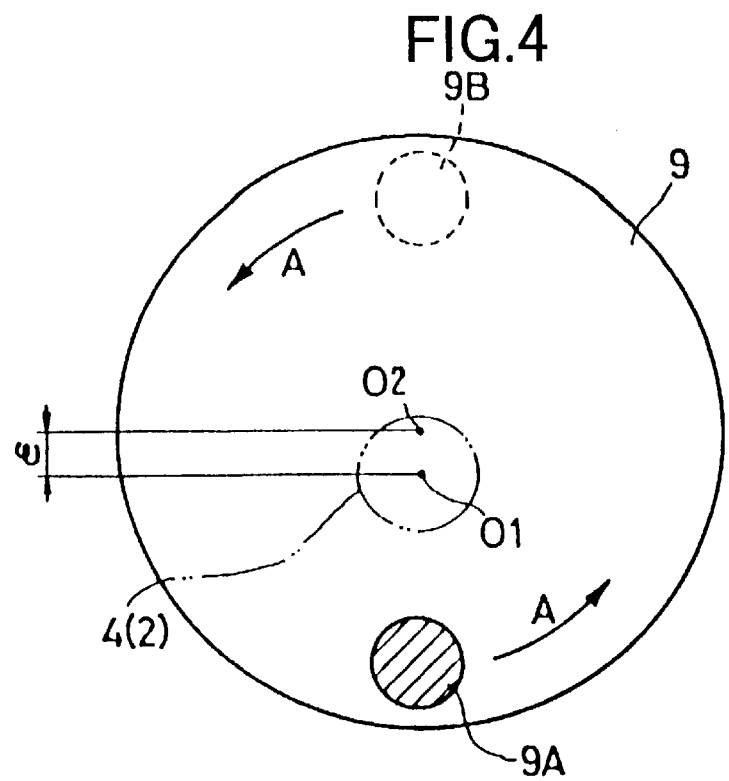
FIG. 4 is an explanatory view showing a state in which the eccentric disk is offset from the cam shaft.
Figure 7:
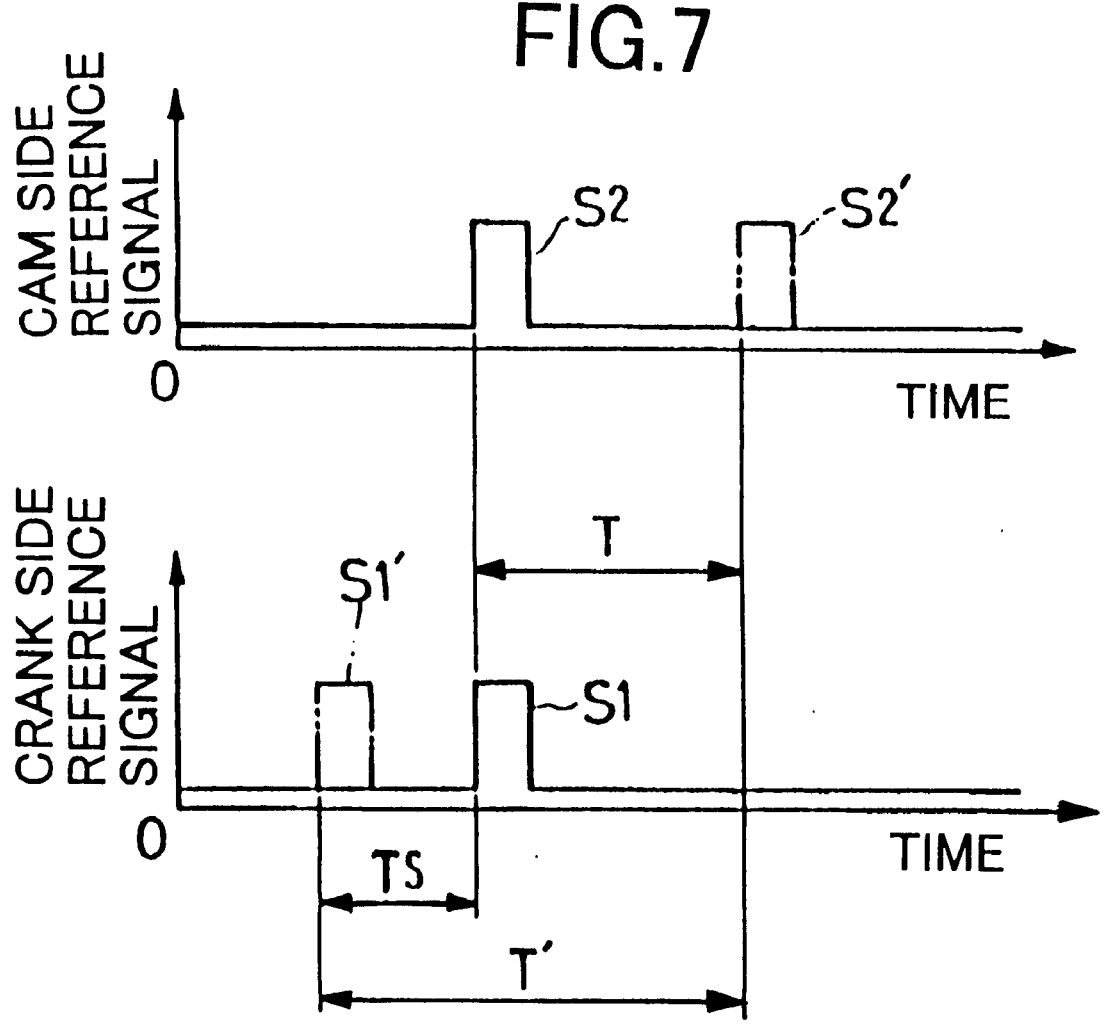
FIG. 7 is a characteristic diagram showing reference signals output from the crank angle sensor and cam position sensor in FIG.3.

The crank angle sensor 11 constitutes, together with the cam position sensor 12, phase difference detecting means. When the rotational phase $\alpha$ of the crankshaft 1 becomes a predetermined rotational phase as shown in FIG. 3, the crank angle sensor 11 detects it and outputs a reference signal S1 as a detection signal, as shown in FIG. 7.

The cam position sensor 12 is provided at the side of cam shaft 4. When the rotational phase $\beta$ of the cam shaft 4 becomes a predetermined rotational phase, the cam position sensor 12 detects it and outputs a reference signal S2 as a detection signal, as shown in FIG. 7.

In the above, the crank angle sensor 11 and cam position sensor 12 are constituted to output the reference signals S1 and S2, respectively, during one rotation (360°) of the cam shaft 4. When the phase difference $\Phi$ is established between the crankshaft 1 and cam shaft 4 by means of the eccentric mechanism 7, the reference signal S2 from the cam position sensor 12 will be relatively shifted by the amount of phase difference $\Phi$ from the position, which is synchronized with the reference signal S1 from the crank angle sensor 11, to such a position S2' as shown in FIG.7. Thus, the phase difference $\Phi$ can be detected based on the time period T between the reference signals S1 and S2', and an engine rotation number N (where k is a constant) by the following equation:

$$\Phi = k \times T \times N \qquad (1).$$

Meanwhile, the crank angle sensor 11 and cam position sensor 12 are connected to a control unit 21 as control means, to be noted later. This control unit 21 is adapted to detect the phase difference $\Phi$ based on the equation (1) by measuring the time period T between the reference signals S1 and S2', arithmetically obtain the rotational angle $\tau$ of the control shaft 10 based on the thus detected value, and feedback control this rotational angle $\tau$ of the control shaft 10 by operating the aforementioned electromagnetic actuator.

There will be explained hereinafter the operation of the apparatus for controlling the valve timing.

When the crankshaft 1 is driven to rotate by the engine, this rotational driving force is transmitted to the drive shaft 2 via the timing belt 3, and then transmitted to the eccentric disk 9 via the connecting plate 5 and engaging pin 9A of the eccentric disk 9. Thus, the eccentric disk 9 is rotated within the disk holder 8 such as in a direction of arrow A in FIG. 2. This rotational driving force is transmitted to the cam shaft 4 via the engaging pin 9B of the eccentric disk 9 and the connecting plate 6, while the cam shaft 4 opens and closes the aforementioned intake valves when the rotational phase $\beta$ thereof becomes predetermined rotational phases.

If the opening and closing timing of intake valves are to be varied, the control shaft 10 is rotated by the aforementioned electromagnetic actuator such that the eccentric disk 9 between the connecting plates 5 and 6 is radially shifted relative to the cam shaft 4 to thereby displace the axis O2—O2 of disk 9 from the axis O1—O1 of cam shaft 4 by the eccentricity amount $\epsilon$.

As a result, the rotational phase $\beta$ of the cam shaft 4 is shifted relative to the rotational phase a of the crankshaft 1 by the phase difference $\Phi$, to thereby shift the opening and closing timing of intake valves, which are opened and closed by the cam shaft 4, correspondingly to the phase difference $\Phi$. Thus, the opening and closing timing of intake valves can be suitably controlled by adjusting the phase difference $\Phi$ to a desired value.

Figure 6:
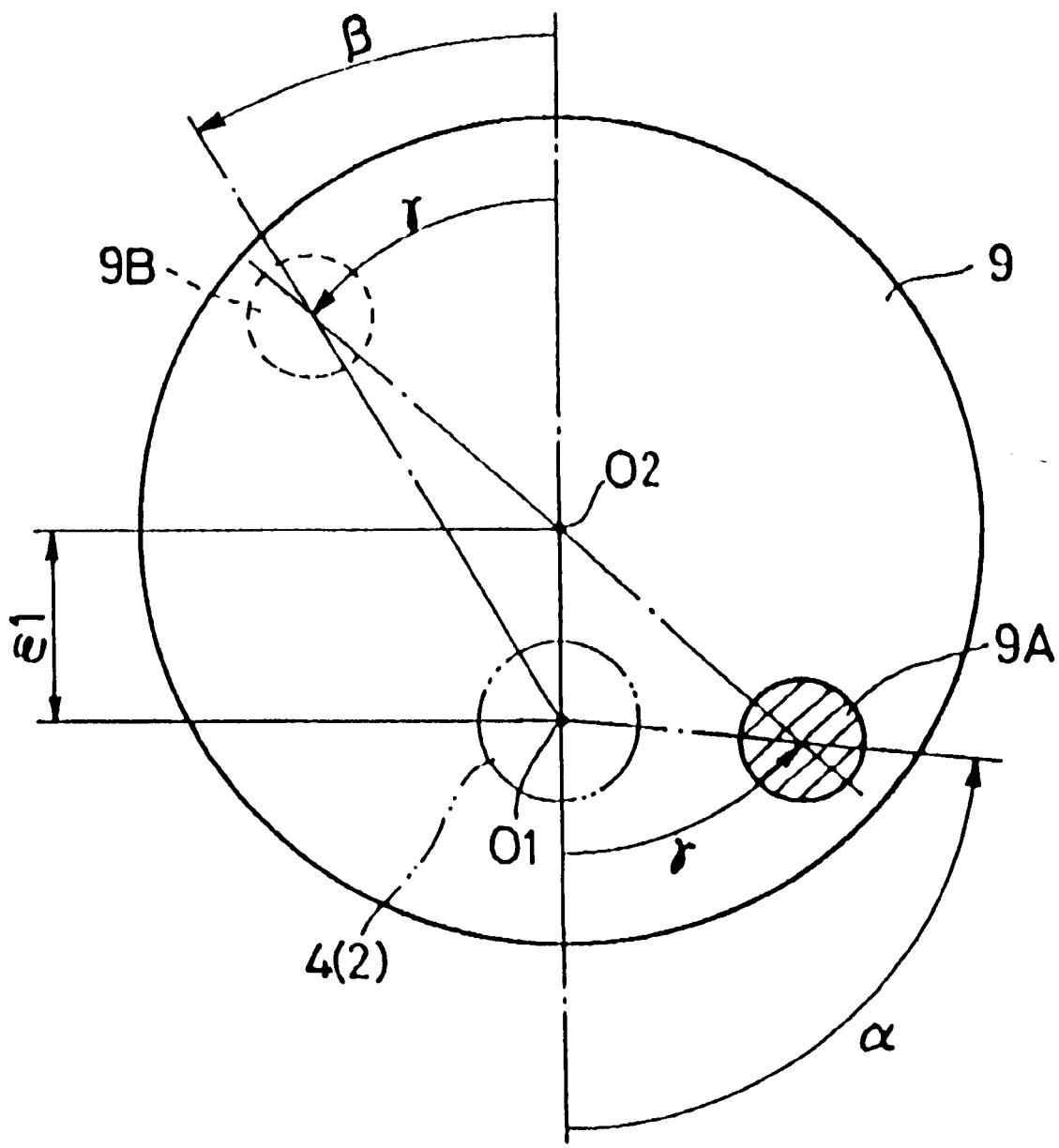
FIG. 6 is an explanatory view showing a state in which the eccentric disk is rotated by a drive shaft.

That is, in such a state that the eccentric disk 9 is shifted by the eccentricity amount $\epsilon 1$ ($\epsilon 1 > \epsilon$) as shown in FIG. 6, the eccentric disk 9 is rotated by an angle $\gamma$ about its center O2 when the crankshaft 1 (drive shaft 2) has rotated by its rotational phase $\alpha$. At this time, the cam shaft 4 is rotated about its center O1 by the engaging pin 9B of the eccentric disk 9 by a rotational phase $\beta$ which has a value different from the rotational phase $\alpha$.

Between the rotational phase a of the crankshaft 1 and rotational phase $\beta$ of the cam shaft 4, there is generated a phase difference $\Phi$ as defined by the following equation (2).

$$\Phi = \alpha - \beta \qquad (2).$$

Further, the characteristic line of the phase difference $\Phi$ has a wave form similar to a sine wave having one cycle corresponding to one rotation (360°) of the cam shaft 4, so that the phase difference $\Phi$ periodically varies in a synchronized manner with the rotational phase $\beta$. The wave form of phase difference $\Phi$ varies correspondingly to the eccentricity amounts $\epsilon$, $\epsilon 1$ of the eccentric disk 9, as depicted by the characteristic lines 13, 14 of FIG. 5.

Figure 5:
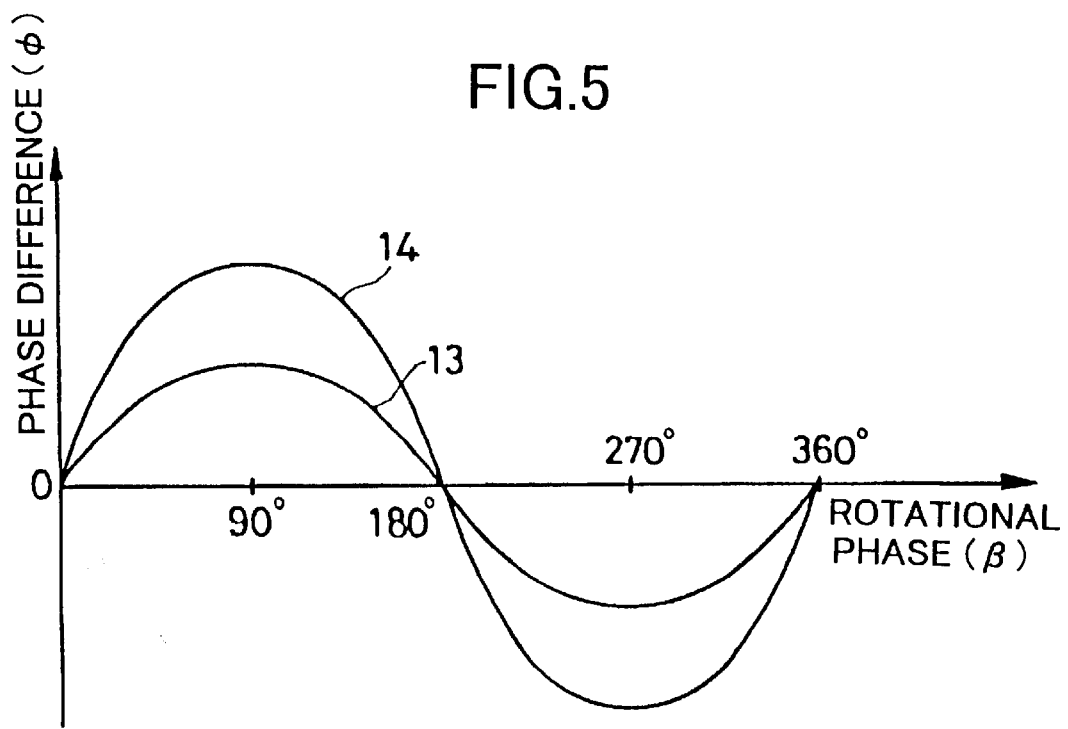
FIG. 5 is characteristic diagram showing variances of phase difference relative to a rotational phase of the cam shaft, depending on an offset amount of the eccentric disk in FIG. 2.

In the above, the phase difference $\Phi$ between the crankshaft 1 and cam shaft 4 varies correspondingly to the eccentricity amount $\epsilon$ of the eccentric disk 9 (i.e., rotational angle $\tau$ of the control shaft 10), as depicted by the characteristic lines 13, 14 of FIG. 5. Thus, it becomes possible to obtain an actual rotational angle $\tau$ (operating amount) of the control shaft 10, by detecting this kind of phase difference $\Phi$.

It might be envisaged to directly detect the rotational angle $\tau$ of the control shaft 10 by a contacting type sensor such as potentiometer. However, in view of such as its durability, it becomes difficult to keep reliability of the valve timing controlling apparatus.

Thus, the control unit 21 is arranged to detect the phase difference Φ based on the reference signals S1 and S2 from the crank angle sensor 11 and cam position sensor 12, respectively, and calculate or arithmetically obtain the actual rotational angle τ of the control shaft 10 based on the thus detected value in an uncontacted manner. In addition, there is calculated a target value τ0 (target phase difference) of the control shaft 10 such as based on engine rotation number, and the control shaft 10 is feedback controlled such that the calculated value of rotational angle τ becomes the target value τ0 (feedback control means).

Figure 8:
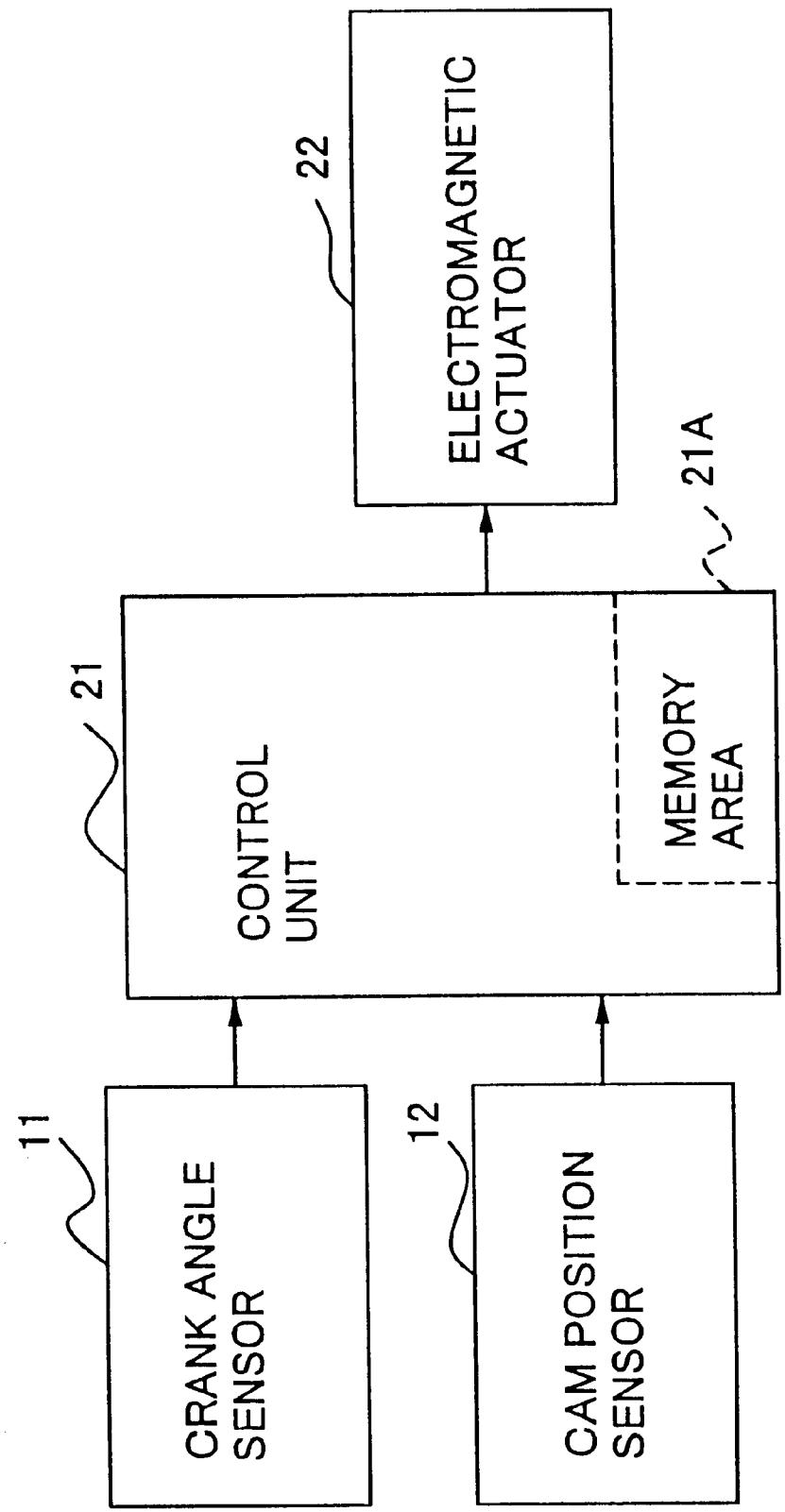
FIG. 8 is a block diagram showing a valve timing controlling system in the embodiment.

FIG. 8 shows the control unit 21 as the control means in the above described valve timing controlling apparatus. This control unit 21 is constituted such as of a microcomputer having a memory area 21A such as ROM, RAM, an input side to which the crank angle sensor 11 and cam position sensor 12 are connected, and an output side to which the electromagnetic actuator 22 is connected for rotating the control shaft 10.

Stored in the memory area 21A are a processing program (see FIGS. 9 through 11) for controlling the valve timing as will be described later, and the target value τ0 for the rotational angle τ of the control shaft 10 in a form of a characteristic map corresponding to for example engine rotation number and basic injection quantity (engine load). Further stored in the memory area 21A is a calculation map for arithmetically obtaining the rotational angle τ of the control shaft 10 based on the phase difference Φ between the crankshaft 1 and cam shaft 4.

The electromagnetic actuator 22 for rotating the control shaft 10 is constituted such as of a linear type stepping motor, and functions so, in response to a driving signal output by the control unit 21.

Figure 9:
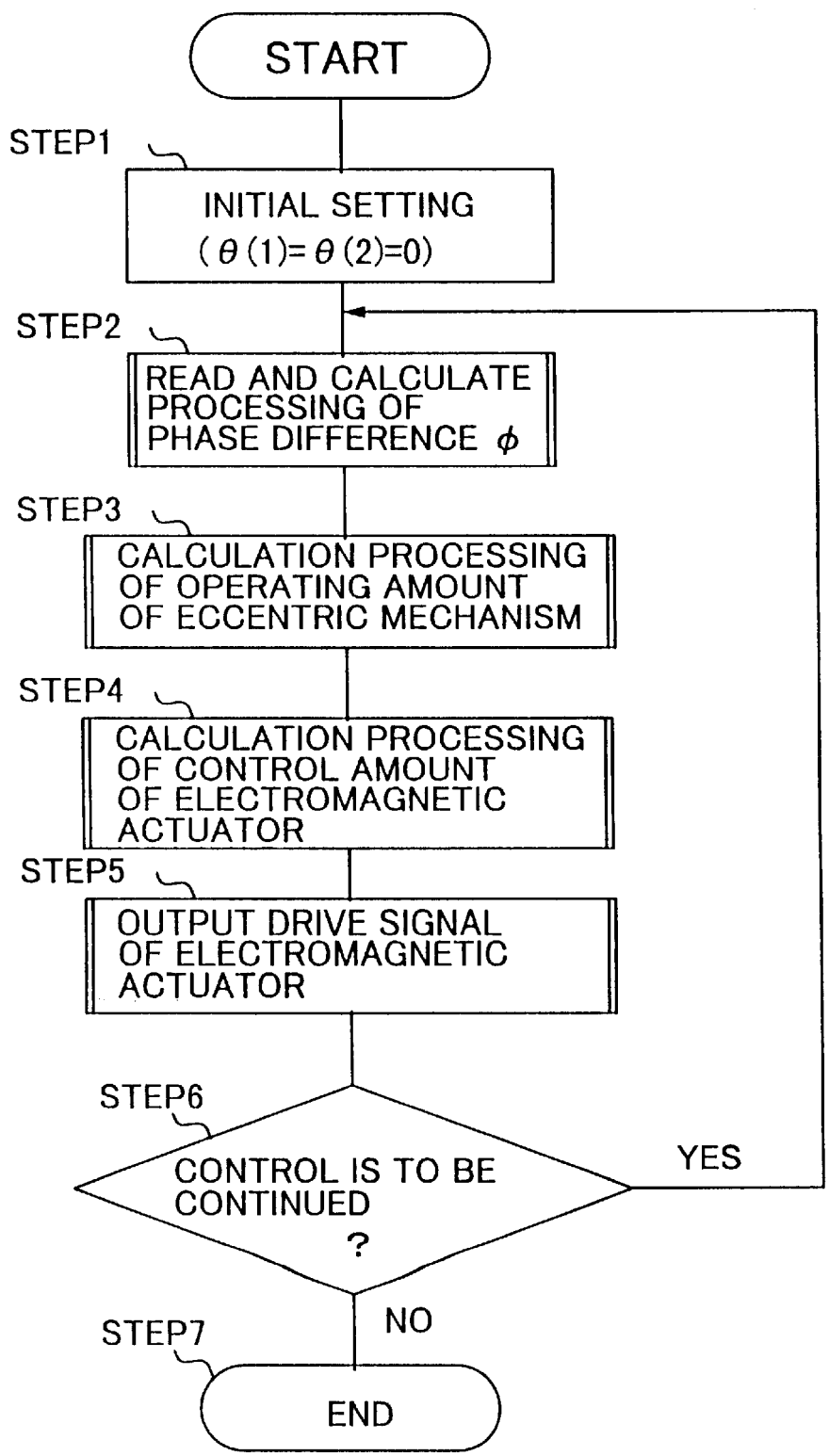
FIG. 9 is a flow chart showing the contents of valve timing processing by a control unit in FIG. 8.
Figure 10:
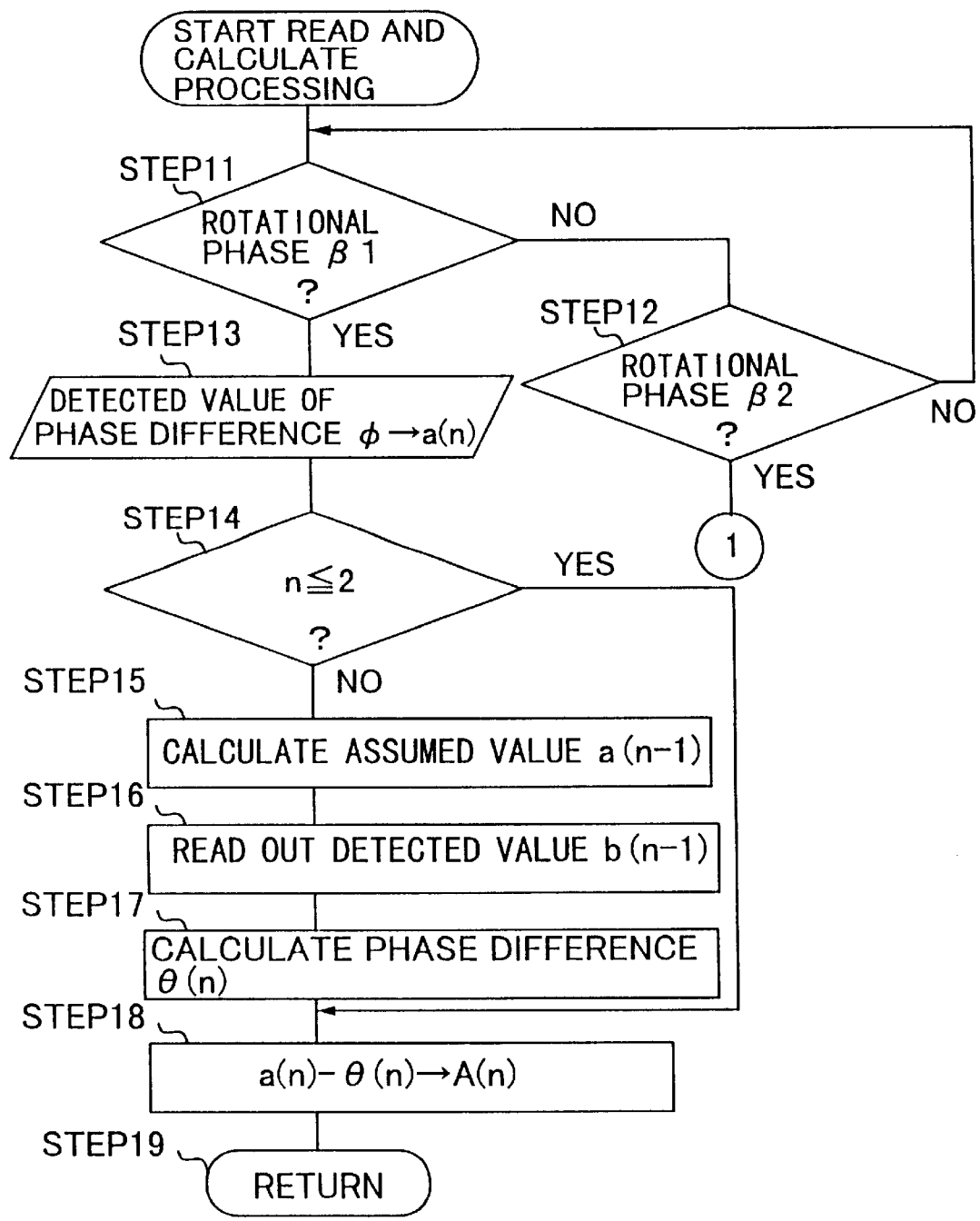
FIG. 10 is a flow chart showing a first embodiment of a routine for read and calculate processing of the phase difference in FIG. 9.
Figure 11:
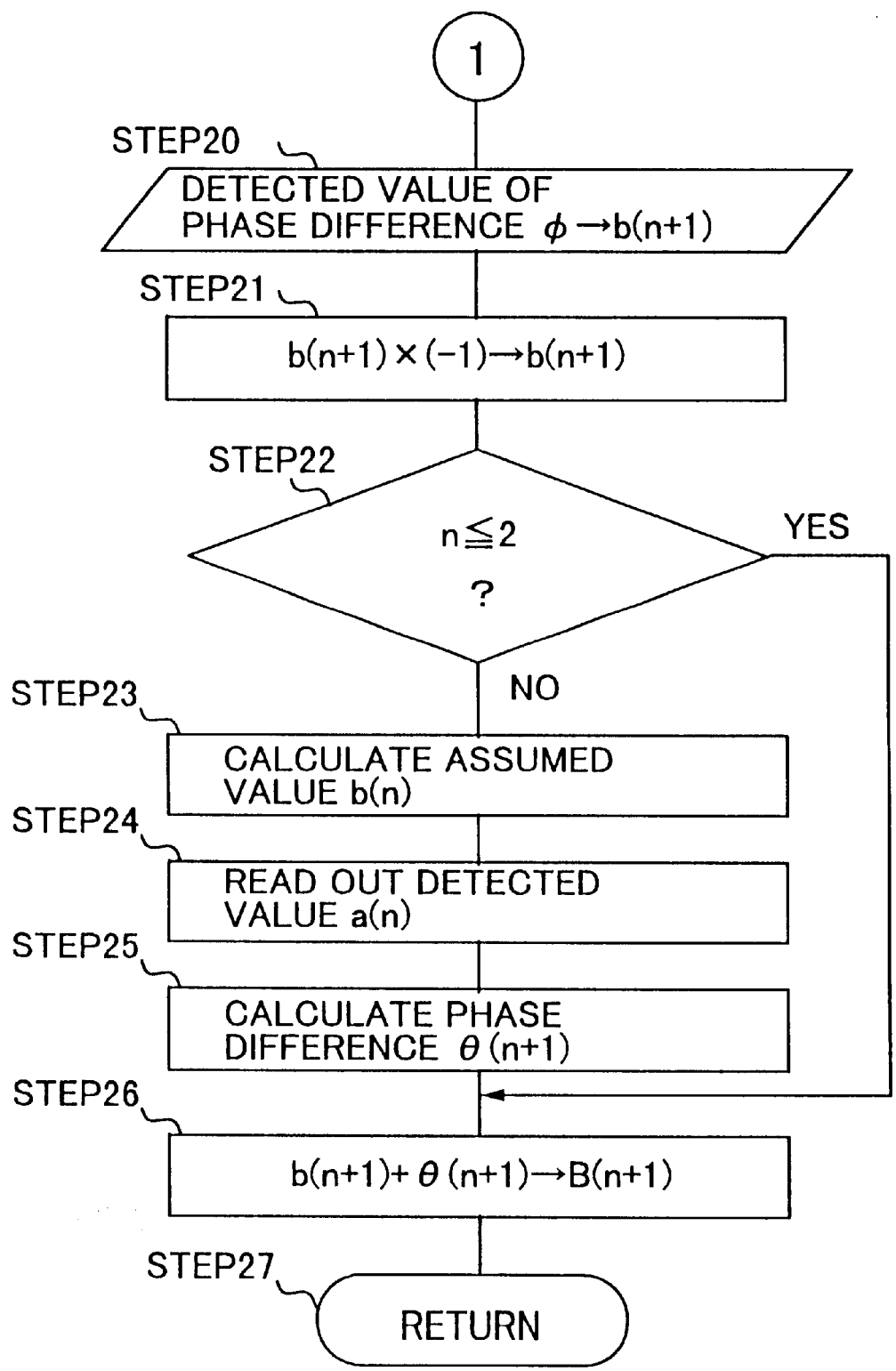
FIG. 11 is a remainder of the flow chart of FIG. 10.

When the control unit 21 has decided based on the engine speed that the engine is in a driving condition necessitating the valve timing control, the unit 21 starts the valve timing control processing shown in FIGS. 9 through 11.

At step 1, the initial values θ(1), θ(2) of a phase deviation θ(n), which will be calculated at step 2, are initialized to zero. The counting value n (n=1, 2, 3, . . . ) is counted up or incremented by "1" whenever the rotational phase β of the cam shaft 4 becomes first and second values β1 and β2 after the valve timing control has been started.

Next, at step 2, there is performed a read and calculate processing for the phase difference Φ according to steps 11 through 27 to be noted later in FIGS. 10 and 11, so that the correct phase difference Φ0, which is required for arithmetically obtaining the rotational angle τ of the control shaft 10, is arithmetically obtained as a calculated value A(n) and a calculated value B(n+1) based on a detected value a(n) and detected value b(n+1) of the phase difference Φ.

The term "detected value" means those values which are obtained by the equation (2) based on the detected signals from the crank angle sensor 11 and cam shaft sensor 12. Further, the term "correct (or target) phase difference Φ0" is used to represent the characteristic of phase difference (see FIG. 5) which periodically varies in a manner synchronized with the predetermined rotational phase of the cam shaft 4. Namely, it represents the phase difference Φ in a state free from any deviation.

At step 3, there is calculated the rotational angle τ (operating amount) of the control shaft 10 such as from a calculation map stored in the memory area 21A, based on the calculated value A(n) and calculated value B(n+1) as calculated at step 2 to represent the correct phase difference Φ0. Thus, there is obtained the rotational angle τ (operating amount) of the control shaft 10 which is actually rotated by the electromagnetic actuator 22.

Next at step 4, in order to feedback control the control shaft 10, there is obtained the target value τ0 (value corresponding to the target phase difference) of the rotational angle τ of the control shaft 10 based on a characteristic map stored in the memory area 21A, which map is prepared such as based on engine rotation number and basic injection quantity. Further, there is calculated a control amount of the electromagnetic actuator 22 necessary for rendering the difference between the obtained target value τ0 and the rotational angle τ of control shaft 10 obtained at step 3, to be smaller than a predetermined hysteresis value.

At step 5, outputted to the electromagnetic actuator 22 is a driving signal corresponding to the control amount as calculated at step 4, so that the electromagnetic actuator 22 rotates the control shaft 10 to thereby make its rotational angle τ to become the target value τ0.

By this operation, the rotational phase β of the cam shaft 4 is shifted relative to the rotational phase α of the crankshaft 1 by the phase difference Φ corresponding to the rotational angle τ (target value τ0) of the control shaft 10, so that each of the aforementioned intake valves can be opened and closed at a suitable timing such as corresponding to engine rotation number.

At step 6, it is decided such as based on engine rotation number, as to whether the driving condition necessitates the continuation of the aforementioned valve timing control. If judged "YES", the processings of steps 2 to 5 are repeated to effect feedback control such that the rotational angle τ of control shaft 10 is continually kept at the target value τ0.

If judged "NO" at step 6, there has been established a condition that the valve timing control is to be stopped such as due to high engine rotation number. Thus, the flow goes to step 7 to terminate the valve timing control.

Figure 12:
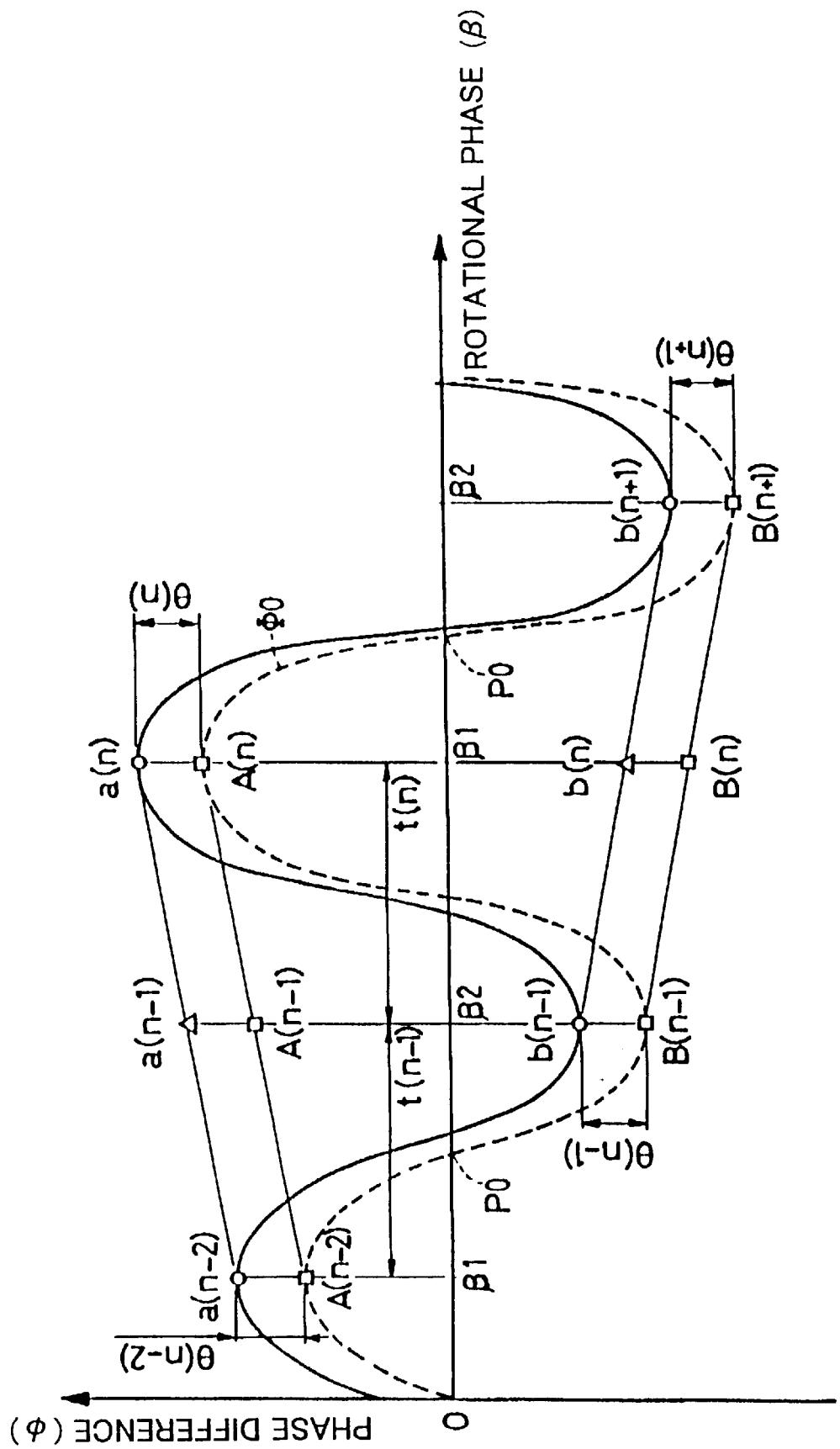
FIG. 12 is a characteristic diagram showing variances of phase difference relative to the rotational phase of the cam shaft, in a deviated state and a correct or target state without deviation.
Figure 13:
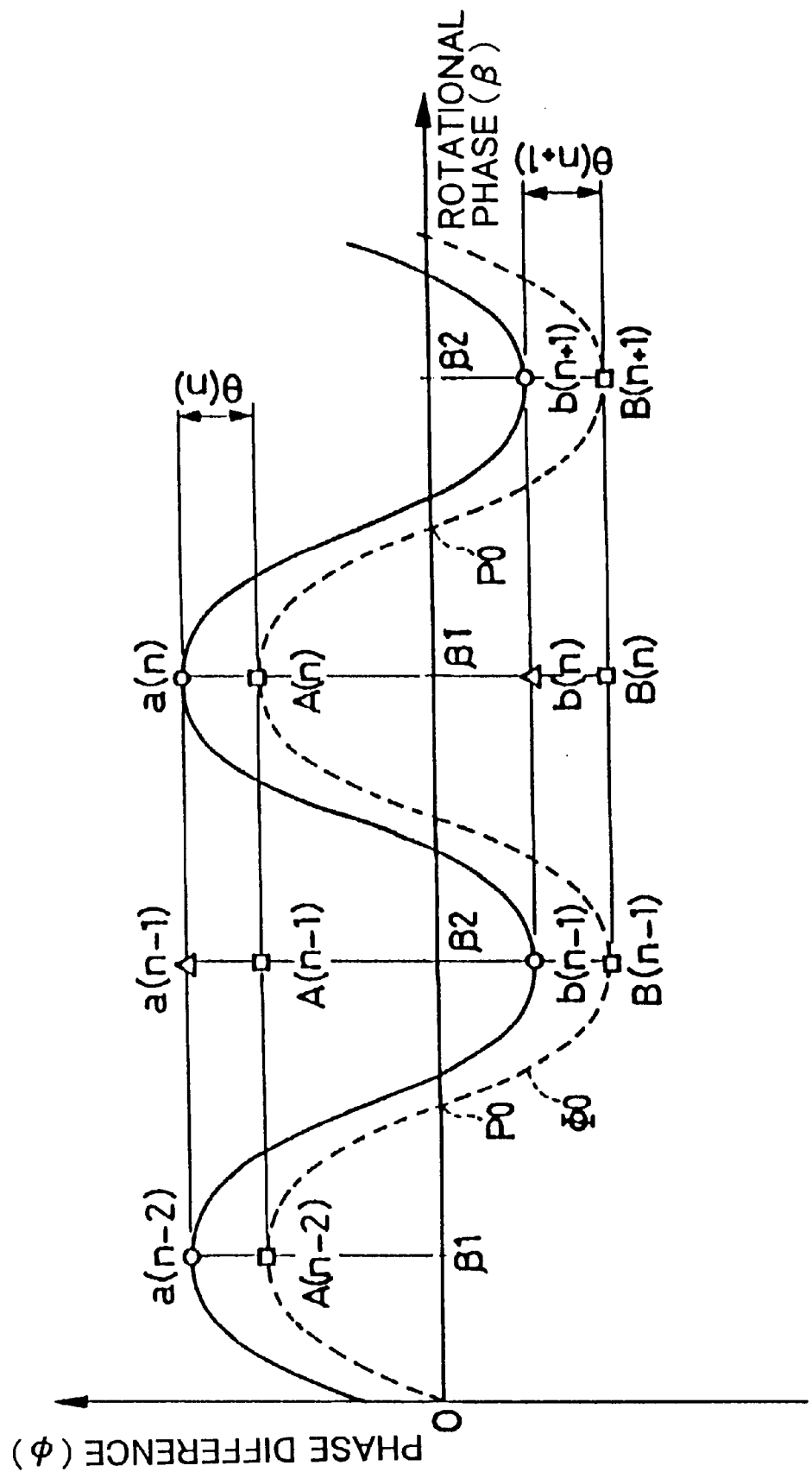
FIG. 13 is also a characteristic diagram showing variances of phase difference relative to the rotational phase of the cam shaft, in a deviated state and a correct state without deviation.

As a result, during the continuation of the aforementioned valve timing control, the phase difference Φ varies periodically corresponding to the rotational phase β of the cam shaft 4, as represented by solid lines in FIGS. 12 and 13. FIG. 12 shows a situation in which a feedback control is effected such that the maximal value (minimal value) of the phase difference Φ is increased at a constant rate with respect to the rotation of cam shaft 4, while FIG. 13 shows a situation that the rotational angle τ of control shaft 10 is kept at a constant value.

Actually, the phase difference Φ to be detected then has a larger value which is wholly deviated from the correct phase difference Φ represented by a dotted line in FIG. 12 (FIG. 13), by a phase deviation θ(n), such as due to deflection of the timing belt 3.

Namely, the rotational phase α of the crankshaft 1 deviates from the rotational phase β of the cam shaft 4 in an increasing direction of the phase deviation θ, such as due to deflection of the timing belt 3. Thus, as shown in FIG. 7, the reference signal S1 of the crank angle sensor 11 is displaced to a position of reference signal S1' represented by a double-dotted line, relative to the reference signal S2 of the cam position sensor 12. As a result, the time T' between these reference signals S1', S2' becomes longer than the time T between the reference signals S1, S2' by a time TS corresponding to the phase deviation θ. Thus, the phase difference Φ, calculated by means of the aforementioned equation (1) based on the time T', has a value larger than phase difference Φ0 (correct phase difference Φ0) free from phase deviation θ. Concretely, as shown in FIGS, 12 and 13, the calculated phase difference Φ has a value (represented by a solid line) larger than the correct phase difference Φ0 (represented by a solid line) which is to be generated by actually rotating the control shaft 10, by the phase deviation θ.

9

The correct phase difference Φ0 is to have a wave form substantially centrosymmetrical about a zero point position P0 to be noted later, relative to the rotational phase β of the cam shaft 4.

There will be explained hereinafter the read and calculate processing of phase difference Φ, including the detection processing of phase deviation θ and correction processing based on the phase deviation θ, with reference to FIGS. 10 and 11.

The reference characters a(n) and b(n+1) shall represent a first detected value and a second detected value, respectively, and A(n) and B(n+1) shall represent a first calculated value and a second calculated value of the correct phase difference Φ0, respectively, corresponding to the detected values a(n) and b(n+1). Further, those assumed values a(n−1), b(n), A(n−1), and B(n), which do not lie on the characteristic line of the phase difference Φ (correct phase difference Φ0) in FIG. 12, shall be calculated in an assumed manner as described later.

At steps 11 and 12 in FIG. 10, in order to detect the timing for reading in the first detected value a(n) and the second detected value b(n+1), it is judged as to whether the rotational phase β of the cam shaft 4 has reached the first or second rotational phase β1, β2. In this respect, the first and second rotational phases β1, β2 are previously defined as those rotational positions which are shifted forwardly and backwardly of the rotational phase β, respectively, from the rotational position (hereinafter called "zero point position P0") where the correct phase difference Φ0 of cam shaft 4 becomes substantially zero during one rotation of cam shaft 4 as represented by the dotted line in FIGS. 12 and 13, by a fixed degree of angle (such as 90° corresponding to the maximal and minimal positions of phase difference). Supposing that the zero point position P0 is at 180°, the first rotational phase β1 is set at a position of 90°, and the second rotational phase β2 is set at a position of 270°.

At step 11, if judged "YES", the rotational phase β of the cam shaft 4 has reached the first rotational phase β1, so that the flow goes to steps 13 through 19 to calculate the first calculated correct value A(n) based on the first detected value a(n).

If judged "NO" at step 11, the flow goes to step 12 to effect a decision processing for the second rotational phase β2. If judged "YES" at step 12, the rotational phase β of the cam shaft 4 has reached the second rotational phase É¿2, so that the flow goes to the steps 20 through 27 in FIG. 11 to thereby calculate the second calculated value B(n+1) based on the second detected value b(n+1). If judged "NO" at step 12, the decision process at steps 11 and 12 are repeated until the rotational phase β of cam shaft 4 becomes the rotational phase β1 or β2.

Hereinafter, the processing to be performed at steps 13 through 19 will be described, in such a case that the wave form of phase difference Φ varies in a manner shown in FIG. 12. At step 13, the phase difference Φ calculated from the equation (1) by means of the crank angle sensor 11 and the cam shaft sensor 12 is read in as the first detected value a(n), when the rotational phase β of cam shaft 4 has reached the first rotational phase β1.

Next, at step 14, it is judged as to whether the counting value n is less than 2 (n≤2) or not. If judged "NO", it is not the first time of reading in the first detected value a(n), so that the flow goes to step 15.

At step 15, in order to effect a comparison calculation with the last detected value b(n−1), the assumed value a(n−1) corresponding to this lastl detected value b(n−1) is assumingly calculated based on the before last detected

10 value a(n) and the last but one first series of detected phase difference a(n−2), as follows:

$$a(n-1)=a(n-2)+[a(n)-a(n-2)]\times t(n-1)/[t(n)+t(n-1)] \quad (3)$$

In this case, the assumed value a(n−1) is a value (corresponding to the position of rotational phase β2) obtained by interiorly dividing a line connecting between the detected values a(n−2) and a(n) at a ratio of t(n−1):t(n). Further, the time t(n) means that period of time which has lapsed from the time that the rotational phase β of cam shaft 4 reached the last rotational phase β2 (rotational phase β1) up to the time that the same has reached the current rotational phase β1 (rotational phase β2). This time t(n) is measured such as by a software timer provided by control unit 21.

In the above, the detected value a(n−2) is deviated from the calculated value A(n−2) by a phase deviation θ(n−2), and the detected value a(n) is deviated from the calculated value A(n) by a phase deviation θ(n). Thus, the assumed value a(n−1) obtained based on them is supposed to have a value greater than the assumed value A(n−1) which can be obtained by an equation similar to the equation (3) based on the calculated value A(n−2) and A(n), by such a phase deviation θ(n) as obtained by the following equation:

$$a(n-1)=A(n-1)+\theta(n) \quad (4)$$

In this concern, it has been just supposed that the phase deviation θ(n) such as due to deflection of the timing belt 3 is substantially constant during such a short time that the cam shaft 4 makes two rotations. Thus, the above equation (4) can be derived by regarding the phase deviations θ(n), θ(n−1) and θ(n−2) as being equal values.

Next, at step 16, to perform a comparative calculation with the assumed value a(n−1), there is read out the detected value b(n−1) which has been read in at step 20 when the rotational phase β of the cam shaft 4 has reached the rotational phase β2, the processing at step 21.

In this concern, similarly to the detected value a(n), the detected value b(n−1) is deviated from the calculated value B(n−1) by the phase deviation θ(n). However, the detected value b(n−1) has a positive value, since the sign thereof has been inverted at step 21 as will be explained later. Thus, the value b(n−1) has value smaller than the calculated value B(n−1) such as by the phase deviation θ(n) as expressed by the following equation:

$$b(n-1)=B(n-1)-\theta(n) \quad (5).$$

As explained above, the correct phase difference Φ0 has the wave form substantially centrosymmetrical about the zero point position P0, and the first and second rotational phases β1 and β2 are established symmetrically with respect to the zero point P0. Thus, the absolute value of the assumed value A(n−1) becomes equal to that of the calculated value B(n−1), as follows, in which the former difference A(n−1) being obtained correspondingly to the second rotational phase β2 based on the calculated values A(n−2) and A(n):

$$A(n-1)=B(n-1) \quad (6).$$

Thus, there can be derived an equation for calculating the phase deviation θ(n) based on the assumed value a(n−1) and the detected value b(n−1), from the aforementioned equations (4) through (6), as follows, so that the phase deviation θ(n) is calculated by this equation at step 17 (phase deviation calculation means):

$$\theta(n)=[a(n-1)-b(n-1)]/2 \quad (7)$$

Next, at step 18, the calculated value A(n) is calculated by correcting the detected value a(n) with the phase deviation θ(n), by the following equation:

$$A(n)=a(n)-\theta(n) \tag{8}$$

Via step 19, the flow goes back to step 3 to calculate the rotational angle τ of the control shaft 10 based on the calculated value A(n).

In the above, if judged "YES" at step 14, the counting value n is equal to or less than 2, which means that the rotational phase β of the cam shaft 4 has reached the rotational phase β1, for the first time after the starting of the valve timing control. Thus, the flow goes to step 18 without performing the processings at steps 15 through 17, to initially calculate the calculated value A(n) based on the phase deviation θ(n) initialized at step 1.

When the cam shaft 4 has further rotated such that its rotational phase β reaches the second rotational phase β2, the flow goes from step 12 to step 20 shown in FIG. 11, to perform the processing substantially same with those performed at the steps 13 through 19.

Namely, at step 20, the phase difference Φ is read in as the detected value b(n+1). At step 21, the sign of this detected value b(n+1) is inverted to treat this difference b(n+1) as an absolute value.

Next, at step 22, it is judged as to whether the counting value n is equal to or less than 2 or not. If judged "YES", it is the first reading at the rotational phase β2, so that the flow goes to step 26 to calculate the calculated value B(n+1) for the first time. If judged "NO" at step 22, the flow goes to step 23.

At step 23, there is assumingly calculated the assumed value b(n), which corresponds to the lastly detected value a(n), based on the second series of detected phase difference b(n+1) and the before last detected value b(n−1), by means of a calculation similar to the aforementioned equation (3).

Next, at step 24, the last detected value a(n) is read out to perform a comparative calculation with the assumed value b(n). At step 25, the phase deviation θ(n+1) is calculated based on the detected value a(n) and the assumed value b(n), by a calculation similar to the aforementioned equation (7).

Finally, at step 26, this phase deviation θ(n+1) is added to the detected value b(n+1) to thereby calculate a calculated value B(n+1), and thereafter the flow goes back to step 3, via step 27.

Meantime, as shown in FIG. 13, the phase difference Φ has a value deviated from the correct phase difference θ0 by a phase deviation θ(n), even in a case that the rotational angle τ of the control shaft 10 is kept at a constant angle. Thus, the calculated value A(n) and the calculated value B(n+1) for the correct phase difference Φ0 can be arithmetically obtained based on the first detected value a(n) and the second detected value b(n+1) by performing the processing same with the case shown in FIG. 12.

Thus, this embodiment is constituted such that: the phase deviation θ(n) is calculated based on the first detected value a(n) and the second detected value b(n+1), in which the phase differences Φ are read in, respectively, when the rotational phase β of the cam shaft 4 has become the first and second rotational phases β1 and β2; the correct phase difference Φ0 is calculated as the first calculated value A(n) or B(n+1), based on this phase deviation θ(n); and the feedback control is effected such that the rotational angle τ of the control shaft 10 calculated based on these values A(n), B(n+1) is corrected to a value corresponding to its target value τ0.

The phase deviation θ(n) can be accurately calculated by means of the equation (7) based on these detected values a(n), b(n+1), even when these values a(n), b(n+1) include any phase deviation θ(n) relative to the correct phase difference Φ0. Thus, the calculated values A(n), B(n+1) can be arithmetically obtained with high accuracy, by excluding the calculated value of phase deviation θ(n) from the detected values a(n), b(n+1), as shown in steps 18 and 26.

Namely, it is constituted that the first and second rotational phases β1 and β2 are set to be rotational positions shifted from the zero point position P0 of the cam shaft 4 by 90° forwardly and backwardly, respectively, and the calculated values A(n), B(n+1) are calculated based on the detected values a(n), b(n+1) read in during every two rotations of the cam shaft 4. Thus, the phase deviation θ(n) can be precisely obtained, by calculatingly comparing the last assumed value a(n−1) with the last detected value b(n−1) corresponding thereto, in which the assumed value a(n−1) being assumedly calculated based on the presently detected value a(n) and the before last detected value a(n−2), while making use of the fact that the absolute value of the assumed value A(n−1) becomes equal to that of the calculated value B(n−1).

Therefore, according to this embodiment, the correct phase difference Φ0 can be precisely calculated or arithmetically obtained based on the detected value of phase difference Φ, even in such a case that deflection of the timing belt 3 has occurred. Thus, the rotational angle τ of the control shaft 10 can be calculated with high accuracy based on such a calculation result, so that the control shaft 10 (eccentric mechanism 7) can be feedback controlled in a stable manner based on the calculated value of the rotational angle τ.

Further, the correct phase difference Φ0 can be precisely calculated based on the detected value of phase difference Φ, even in such a case that the synchronization between the reference signals S1 and S2 of the crank angle sensor 11 and cam position sensor 12, respectively, is out of order from the first due to erroneous or defective installation during the assembling process such as of the crankshaft 1, cam shaft 4, crank angle sensor 11, or cam position sensor 12, to thereby ensuredly avoid the deterioration of the feedback control accuracy due to such erroneous or defective installation.

There will be described hereinafter a second embodiment of the read and calculate processing (step 2 of FIG. 9) of the phase difference Φ, with reference to FIGS. 14 and 15.

Figure 14:
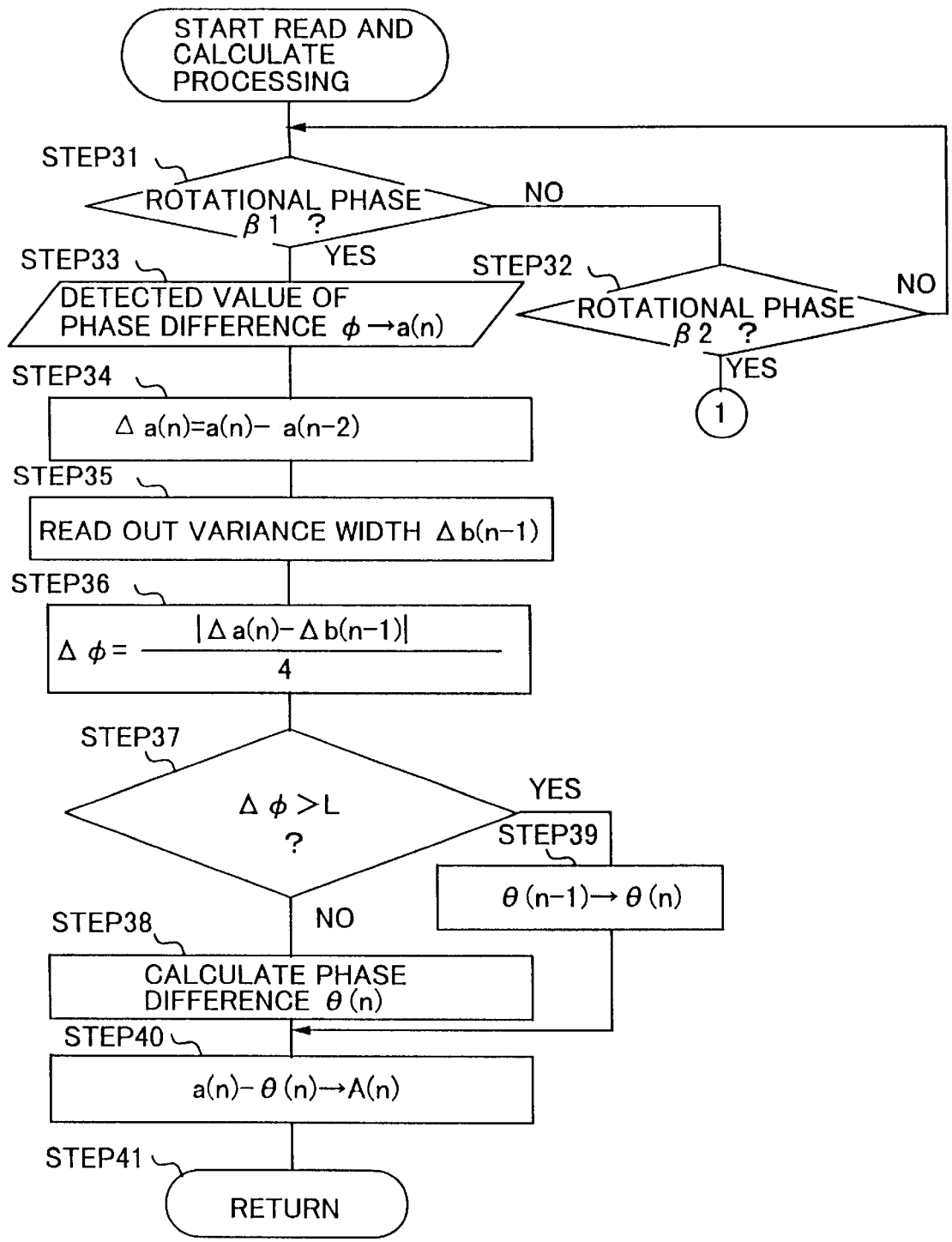
FIG. 14 is a flow chart showing a second embodiment of a routine for read and calculate processing of the phase difference in FIG. 9.

Firstly at steps 31 and 32 in FIG. 14, it is judged as to whether the rotational phase β of the cam shaft 4 has reached the first or second rotational phase β1 or β2, so as to detect the timing for reading in the aforementioned first detected value a(n) or second detected value b(n+1).

If judged "YES" at step 31, the rotational phase β of the cam shaft 4 has reached the first rotational phase β1, so that the flow goes to steps 33 through 41 to calculate the first calculated value A(n) based on the first detected value a(n).

If judged "NO" at step 31, the flow goes to step 32 to perform judgment processing for the second rotational phase β2. If judged "YES" at step 32, the rotational phase β of the cam shaft 4 has reached the second rotational phase β2, so that the flow goes to steps 42 through 51 to calculate the calculated value B(n+1) based on the detected value b(n+1). If judged "NO" at step 32, the judgment processing at steps 31 and 32 are repeated until the rotational phase β of the cam shaft 4 reaches the rotational phase β1 or β2.

Figure 16:
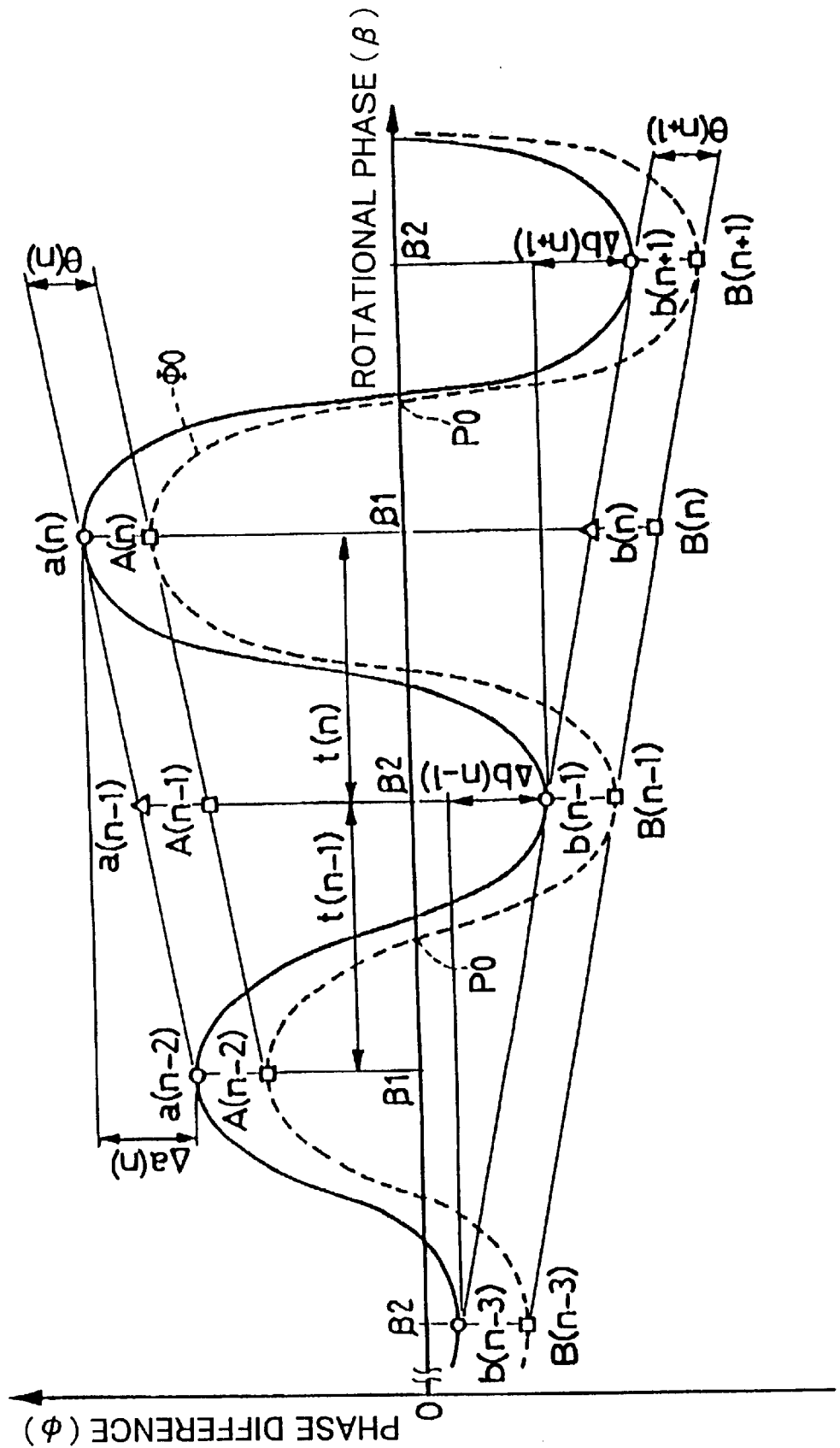
FIG. 16 is a characteristic diagram showing variance width of phase difference relative to a rotational phase of the cam shaft.

There will be described hereinafter the processing to be performed at steps 33 through 41, about such a case that the detected or actual phase difference Φ is varying or progressing as shown in FIG. 16. At step 33, there is fetched the phase difference Φ calculated by the aforementioned equation (1) from the crank angle sensor 11 and cam position sensor 12 as the detected value a(n), when the rotational phase β of the cam shaft 4 has reached the first rotational phase β1.

Next, at step 34, based on the detected value a(n) and the before last detected value a(n−2), there is calculated a variance width Δa(n) of the detected value a(n) which has varied during one rotation of the cam shaft 4, by the following equation:

$$\Delta a(n) = a(n) - a(n-2) \tag{9}$$

Further, at step 35, there is read out a variance width Δb(n−1), which has been calculated through an equation (12) by reading in the last detected value b(n−1) as will be described later for step 44 in FIG. 15. At step 36, the phase variance rate ΔΦ is calculated by the following equation, based on the variance widths Δa(n), Δb(n−1) [phase variance rate calculation means].

$$\Delta\Phi = [\Delta a(n) - \Delta b(n-1)]/4 \tag{10}$$

In the above, the phase variance rate ΔΦ means a calculated value for representing a varying state of the detected values a(n), b(n−1). For example, the phase variance rate ΔΦ is zero, if the variance widths Δa(n), Δb(n−1) are equal to each other, such as when the phase difference Φ is varying at a constant rate as shown in FIG. 16. However, if the varying rate of phase difference Φ has changed on its way, the variance widths Δa(n), Δb(n−1) will have values different from each other, before and after such a change, so that the phase variance rate ΔΦ will also have a value corresponding to a difference between these different values.

At step 37, the phase variance rate ΔΦ is compared with an allowable limit L previously stored in the memory area 21A. This allowable limit L has a predetermined value which is determined in advance such as correspondingly to detecting precision (detecting precision in phase difference Φ) of the crank angle sensor 11 and cam position sensor 12, or controlling precision of the electromagnetic actuator 22. For example, it is determined to have a value of approximately 0.5°.

If the phase variance rate ΔΦ has exceeded the allowable limit L, the phase deviation θ(n) can not be precisely calculated at step 38 to be described later. As such, if judged "YES" at step 37, the phase variance rate ΔΦ has exceeded the allowable limit L, so that the flow goes to step 39 without calculating the phase deviation θ(n) at step 38.

Contrary, if judged "NO" at step 37, the phase variance rate ΔΦ is equal to or smaller than the allowable limit L. Then, it is judged that the phase deviation θ(n) can be precisely calculated, so that the flow goes to step 38 to calculate the phase deviation θ(n) in a manner similar to steps 15 through 17 described in the aforementioned first embodiment.

Meanwhile, at step 39, the phase deviation θ(n−1) lastly calculated at step 38 is substituted for the phase deviation θ(n) to be presently calculated, since this phase deviation θ(n) can not be precisely calculated. Based on this phase deviation θ(n−1), the calculated value A(n) is correctedly calculated at step 40. Namely, if the phase variance rate ΔΦ has exceeded the allowable limit L, there is not performed an updating calculation of the phase deviation θ(n) based on the latest detected value, and instead, there is performed a correcting calculation of phase difference Φ by continuously using the phase deviation θ(n−1) which has been calculated based on the phase difference θ when the phase variance rate ΔΦ was equal to or less than the allowable limit L (phase deviation update inhibiting means).

Next, at step 40, the first series of calculated value A(n) is calculated based on the detected value a(n) and the phase deviation θ(n) in a manner as the aforementioned equation (8). Further, the flow goes back to step 3 via step 41, to calculate the rotational angle τ of the control shaft 10 based on the calculated value A(n).

Figure 15:
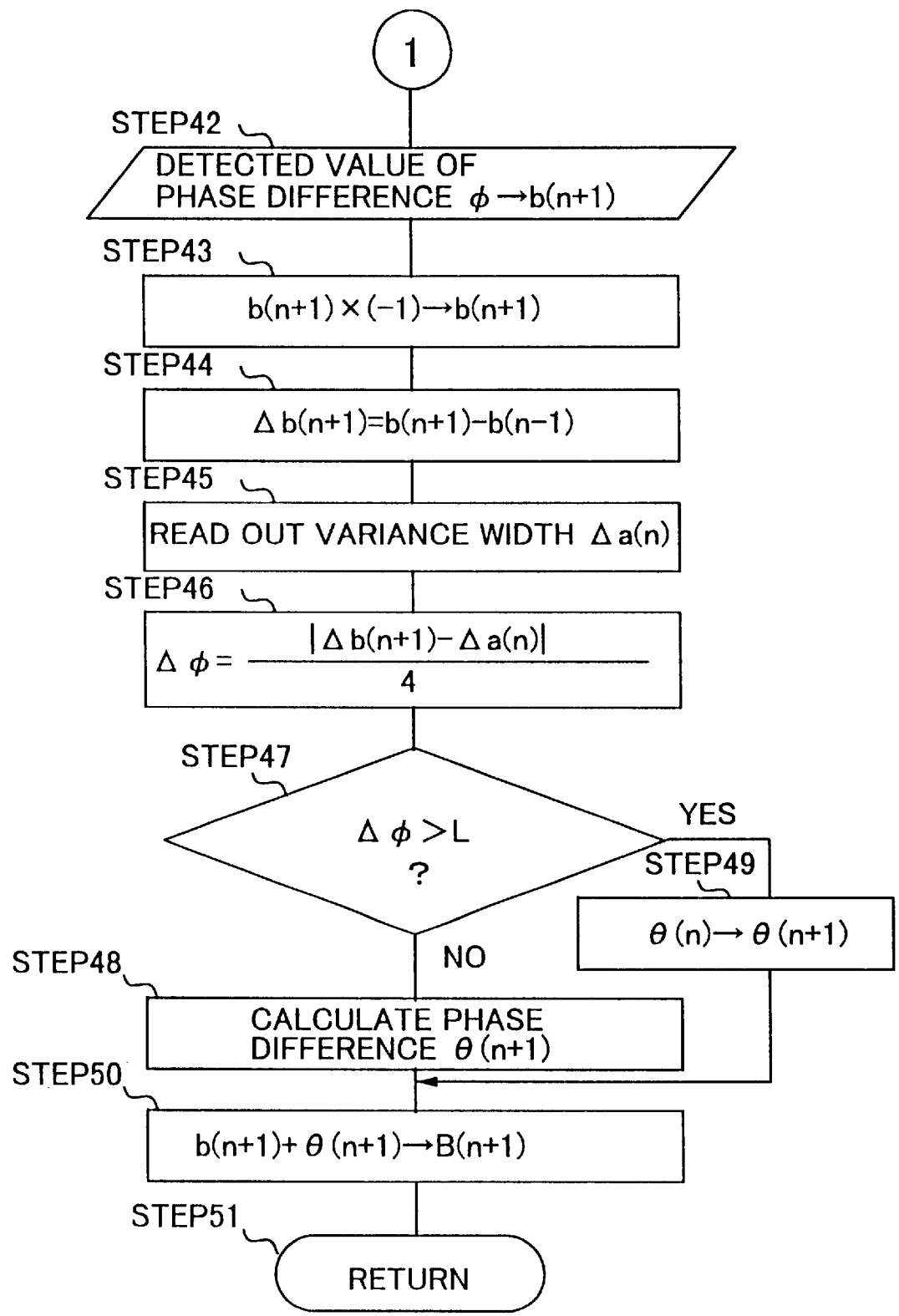
FIG. 15 is a remainder of the flow chart of FIG. 14.

Meanwhile, when the cam shaft 4 has further rotated and its rotational phase β has reached the second rotational phase β2, the flow goes from step 32 to step 42 of FIG. 15 to perform the processing substantially identical with those at the aforementioned steps 33 through 41 to thereby calculate the latest calculated value B(n+1).

At step 42, the phase difference Φ is fetched as the detected value b(n+1), and the sign of this detected value b(n+1) is inverted at step 43 to treat this b(n+1) as an absolute value.

At step 44, the variance width Δb(n+1) of the detected value b(n+1), which has varied during one rotation of the cam shaft 4, is calculated by the following equation, based on the presently detected value b(n+1) and the before lastly detected value b(n−1):

$$\Delta b(n+1) = b(n+1) - b(n-1) \tag{11}$$

In this case, the last variance width Δb(n−1) to be read out at step 35 in FIG. 14 is calculated as follows:

$$\Delta b(n-1) = b(n-1) - b(n-3) \tag{12}$$

At step 45, there is read out the last variance width Δa(n) calculated at step 34 in FIG. 14. At step 46, the phase variance rate ΔΦ is calculated based on the variance widths Δb(n+1) and Δa(n), in a manner similar to the aforementioned equation (10).

Next, at step 47, it is judged as to whether the phase variance rate ΔΦ has exceeded the allowable limit L or not. If judged "NO", the flow goes to step 48 to calculate the present phase deviation θ(n+1) in a manner similar to the aforementioned step 25. If judged "YES" at step 47, the flow goes to step 49 since the present phase deviation θ(n) can not be precisely calculated at step 48. At step 49, the last phase deviation θ(n) is substituted for the phase deviation θ(n+1) to be presently calculated. Thereafter, the flow goes to step 50.

Finally, at step 50, the second series of calculated value B(n+1) is calculated by adding the phase difference Φ(n+1) to the detected value b(n+1). Thereafter, the flow goes back to step 3 via step 51.

Figure 17:
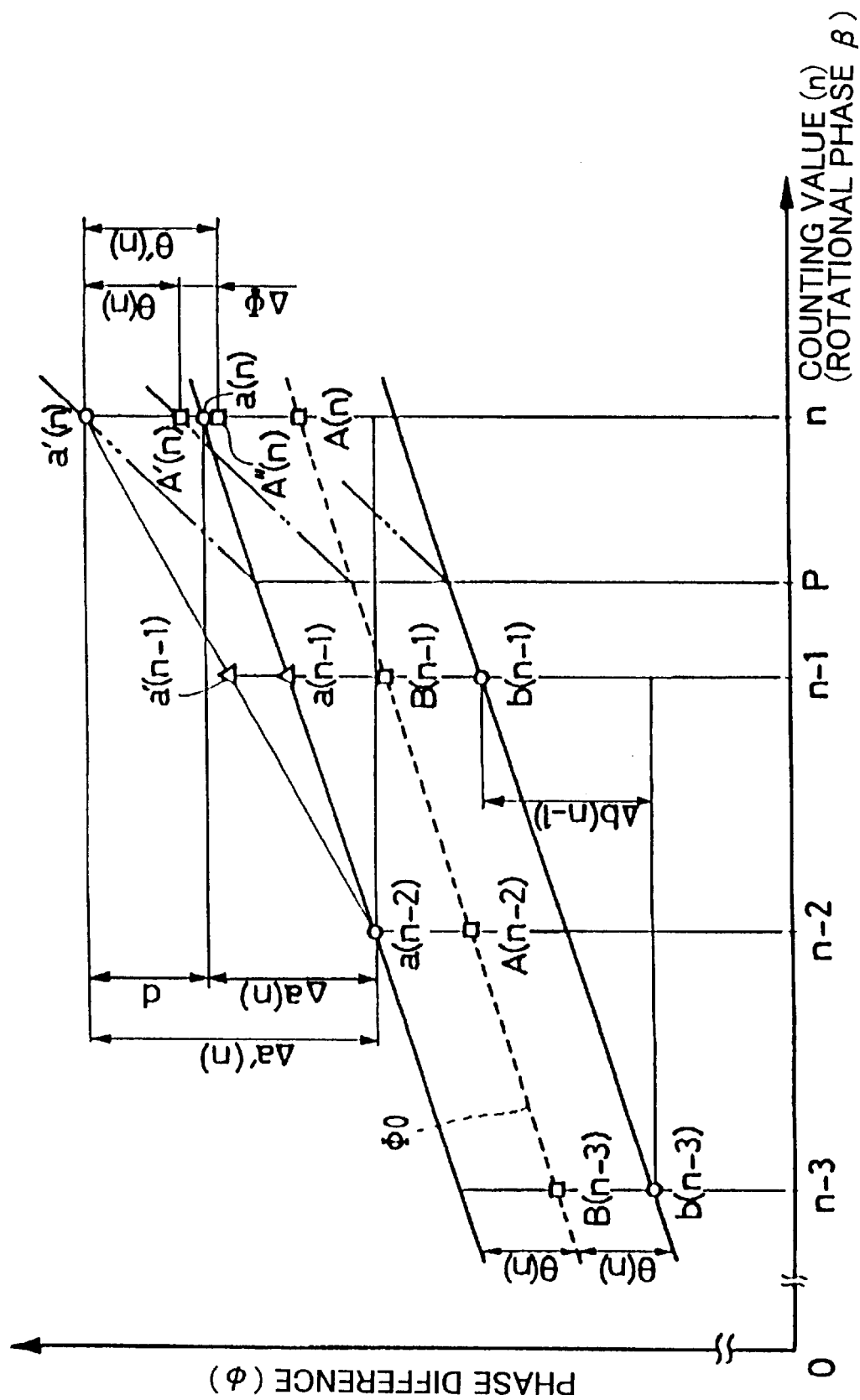
FIG. 17 is an explanatory view for obtaining a phase variance rate and the correct phase difference, based on a detected value of phase difference.

If the increasing proportion of the phase difference Φ (correct phase difference Φ0) has increased as shown by a double dotted line from the position of point P as shown in FIG. 17 while the control shaft 10 is being feedback controlled such that the phase difference Φ (correct phase difference Φ0) is increased as shown by the dotted lines in FIGS. 16 and 17, the detected value a(n) to be detected after the point P increases by a difference amount d as represented by the following equation to become a detected value a'(n):

$$a'(n) = a(n) + d \tag{13}.$$

It is now tried to calculate the phase deviation θ(n)' according to this detected value a'(n) by means of the aforementioned equations (3) and (7).

Firstly, the assumed value a'(n−1) in FIG. 17 can be calculated as follows based on the detected value a'(n) and a(n−2) by the aforementioned equation (3). In this case, it is assumed that the time periods t(n) and t(n−1) are substantially same with each other.

$$a'(n-1)=a(n-2)+[a'(n)-a(n-2)]/2 \quad (14).$$

Further, substituting the detected value a'(n) in the equation (13) for the due term in the equation (14), and comparing it with the equation (3) in which it is assumed that t(n)=t(n−1), there can be derived the following equation:

$$a'(n-1)=a(n-1)+(d/2) \quad (15).$$

Further, the phase deviation θ'(n) is calculated based on this assumed value a'(n−1) and the detected value b(n−1), making use of the aforementioned equation (7), as follows:

$$\theta'(n)=\{[a(n-1)-b(n-1)]/2\}+(d/4)=\theta(n)+(d/4) \quad (16)$$

Meanwhile, when the detected value a'(n) has varied from the detected value a(n−2) as shown in FIG. 17, then the variance width Δa'(n) can be obtained as:

$$\Delta a'(n)=a'(n)-a(n-2) \quad (17).$$

From this equation (17) and the aforementioned equation (9), the difference amount d according to the equation (13) is represented as follows:

$$d=\Delta a'(n)-\Delta a(n) \quad (18).$$

Further, when the phase difference Φ is increasing at a constant proportion, the variance width Δa(n) becomes equal to the variance width Δb(n−1), i.e., Δa(n)=Δb(n−1). Thus, the equation (18) can be rewritten as follows:

$$d=\Delta a'(n)-\Delta b(n-1) \quad (19).$$

Substituting this equation (19) for the term "d" in the equation (16), the phase deviation θ'(n) thereby is written as follows:

$$\theta'(n)=\theta(n)+[\Delta a'(n)-\Delta b(n-1)]/4 \quad (20).$$

If the phase difference has varied like the detected value a'(n) shown in FIG. 17, the phase variance rate ΔΦ according to the aforementioned equation (10) is obtained as follows:

$$\Delta\Phi=[\Delta a'(n)-\Delta b(n-1)]/4 \quad (21).$$

Thus, the phase variance rate ΔΦ according to this equation (21) and the phase deviation θ'(n) according to the equation (20) has the following relationship:

$$\theta'(n)=\theta(n)+\Delta\Phi \quad (22).$$

Namely, even if the phase deviation θ(n) such as due to deflection of the timing belt 3 is constant, this phase deviation θ(n) is calculated as the phase deviation θ'(n) including an error commensurate with the phase variance rate θΦ in case that the variance rate of the phase difference Φ has changed such as due to rotation of the control shaft 10.

Further, the calculated value A"(n), calculated based on this phase deviation θ'(n) and the detected value a'(n) by the equation (8) at step 40, has a value shifted by the phase variance rate ΔΦ in FIG. 17, relative to the calculated value A'(n) which is to be calculated based on the phase deviation θ(n) and the detected value a'(n). Thus, the rotational angle τ of the control shaft 10 to be calculated based on this calculated value A'(n) at step 3 will deviate from or do not coincide with the actual rotational angle.

As such, at steps 37, 47, by comparing the phase variance rate ΔΦ calculated at steps 36, 46 with the allowable limit L corresponding to the detection precision of phase difference É≧ or control precision of electromagnetic actuator 22, it is judged as to whether an error, included in the phase deviation ÉΔ(n) when the variance ratio of phase difference É≧ has changed, has exceeded the allowable limit L or not.

Further, if the phase variance rate ΔΦ has exceeded this allowable limit L, the situation is that the correct phase difference Φ0 can not be precisely calculated from the phase deviation θ(n) because a large error has been included in such a phase deviation θ(n). Thus, at step 39, such as by substituting the lastly calculated phase deviation É≧0 for the phase deviation θ(n) to be presently calculated, the correct phase difference Φ0 is arithmetically obtained as the calculated value A(n), based on the lastly calculated phase deviation θ(n−1) which has been arithmetically obtained before the phase difference Φ has changed to exceed the allowable limit value.

Thus, this embodiment is constituted that: the phase deviations θ(n), ÉΔ(n+1) and the calculated values A(n), B(n+1) are calculated from the first and second detected values a(n), b(n+1), respectively, in each of which the phase difference Φ is read when the rotational phase β of the cam shaft 4 has reached the first and second rotational phases β1, β2, respectively; and the rotational angle τ of the control shaft 10 is feedback controlled, based on the calculated values A(n), B(n+1).

In addition, with respect to the detected value a(n), it is judged as to whether the phase variance rate ΔΦ calculated such as based on the detected values a(n), b(n−1) has exceeded the allowable limit L or not. If the variance ratio of phase difference Φ has largely changed, the lastly calculated phase deviation θΔ(n) is substituted for the phase deviation θ(n) to be presently calculated, to thereby correctingly calculate the calculated value A(n) based on this phase deviation θ(n−1).

Thus, according to this embodiment, even if the detected values a(n), b(n+1) have largely changed by the feedback control of control shaft 10 causing that the error (phase variance rate ΔΦ) included in the phase deviation θ exceeds the allowable limit L, the calculated value A(n) can be correctingly calculated with accuracy based on the last phase deviation θ(n−1).

As a result, the correct phase difference Φ0 can be arithmetically obtained with high accuracy, even if mechanical errors such due to deflection of the timing belt 3 have occurred or the phase difference Φ has transiently changed due to the rotation of the control shaft 10. Further, the correct or target rotational angle τ of the control shaft 10 is arithmetically obtained based the thus obtained correct phase difference Φ0, so that the control shaft 10 can be feedback controlled with great stability.

In the second embodiment, set as the judgment value for comparing with the phase variance rate ΔΦ at steps 37, 47 is the allowable limit L which is previously determined such as based on the detecting precision of the phase difference Φ. However, the present invention is not restricted to it. Namely, it is possible, for example: to arithmetically obtain an averaged value of those detected values a(n), b(n+1) of the phase difference Φ which have been detected over the past several times; to judge as to whether the latest detected value a(n) or b(n+1) has largely changed relative to such an averaged value to exceed an allowable value or not; and to arithmetically obtain the correct phase difference Φ0 based on the last phase deviation θ(n−1) if the latest detected phase difference is judged to have changed to exceed an allowable level.

Further, in the first and second embodiments, converted to angles based on the engine rotation number are such as those rotational phase β and phase difference Φ of the cam shaft 4 which have been arithmetically obtained in a timewise manner from the reference signals S1, S2 of the crank angle sensor 11 and cam position sensor 12. However, the present invention is not restricted to it. For example, it is possible to output an angle signal of every 1° such as from the crank angle sensor 11 to the control unit 21, and, based on this angle signal, to detect such as the rotational phase β and phase difference Φ directly as angle.

Still further, in the above embodiments, there has been exemplarily shown the valve timing controlling apparatus for controlling the opening and closing timing of intake valves. However, the present invention is not restricted to it, and can be applied to those valve timing controlling apparatus which controls the opening and closing timing of either one or both of intake valves and exhaust valves.

What we claimed are:

1. An apparatus for controlling valve timing of engine, comprising:

rotational phase varying means for generating, between a crankshaft and a cam shaft, a phase difference which periodically varies in a manner synchronized with a rotational phase of the cam shaft;

phase difference detecting means for detecting a phase difference generated between the crankshaft and the cam shaft by said rotational phase varying means;

phase deviation calculating means for calculating a phase deviation which is a deviated amount of the phase difference relative to the rotational phase of the cam shaft, based on phase differences which are detected by said phase difference detecting means, respectively, when the rotational phase of the cam shaft has reached predetermined first or second rotational phase;

phase difference correcting means for correcting the phase difference detected by said phase difference detecting means, in response to the phase deviation calculated by said phase deviation calculating means; and feedback controlling means for feedback controlling said rotational phase varying means so as to obtain a target phase difference, based on the phase difference corrected by said phase difference correcting means.

2. An apparatus for controlling valve timing of engine of claim 1, wherein said first rotational phase is defined as a rotational position which is shifted forwardly of the rotational phase by a fixed degree of angle relative to that reference rotational position of the cam shaft at which position the phase difference becomes zero when the phase deviation is zero, and said second rotational phase is defined as a rotational position which is shifted backwardly of the rotational phase by said fixed degree of angle relative to said reference rotational position of the cam shaft.

3. An apparatus for controlling valve timing of engine of claim 2, wherein said fixed degree of angle is that angle which corresponds to maximal and minimal positions of the phase difference.

4. An apparatus for controlling valve timing of engine of claim 1, wherein said phase deviation calculating means assumingly calculates, based on a plurality of phase differences detected in a time series manner in one of said first and second rotational phases, the phase difference in the other of said first and second rotational phases, to arithmetically obtain said phase deviation, based on the thus assumingly calculated phase difference and on the phase difference detected by said phase difference detecting means in the other of said first and second rotational phases.

5. An apparatus for controlling valve timing of engine of claim 1, wherein said rotational phase varying means is constituted to operate based on an operating amount corresponding to the target phase difference, and said feedback controlling means obtains an actual value of said operating amount based on the phase difference corrected by said phase difference correcting means, and feedback controls such that this actual value becomes said operating amount corresponding to the target phase difference.

6. An apparatus for controlling valve timing of engine of claim 1, further comprising:

phase variance rate calculating means for arithmetically obtaining a variance rate of phase differences detected by said phase difference detecting means, and phase deviation update inhibiting means for comparing the variance rate of phase differences calculated by said phase variance rate calculating means with an allowable limit, and inhibiting an updating calculation of the phase deviation by said phase deviation calculating means when the variance rate has exceeded the allowable limit.

7. A method for variably controlling valve timing of engine by generating, between a crankshaft and a cam shaft, a phase difference which periodically varies in a manner synchronized with a rotational phase of the cam shaft, comprising the steps of:

detecting phase differences generated between the crankshaft and the cam shaft when the rotational phase of the cam shaft has reached previously set first and second rotational phases, respectively;

calculating a phase deviation which is a deviated amount of the phase difference relative to the rotational phase of the cam shaft, based on the thus detected phase differences;

correcting the detected value of the phase difference, in response to the phase deviation; and feedback controlling the phase difference so as to obtain a target phase difference, based on the corrected value of the detected phase difference.

8. A method for controlling valve timing of engine of claim 7, wherein said first rotational phase is defined as a rotational position which is shifted forwardly of the rotational phase by a fixed degree of angle relative to that reference rotational position of the cam shaft at which reference position the phase difference becomes zero when the phase deviation is zero, and said second rotational phase is defined as a rotational position which is shifted backwardly of the rotational phase by said fixed degree of angle relative to said rotational position of the cam shaft.

9. A method for controlling valve timing of engine of claim 7, wherein said fixed degree of angle is an angle which corresponds to maximal and minimal positions of the phase difference.

10. A method for controlling valve timing of engine of claim 7, wherein based on a plurality of phase differences detected in a time series manner in one of said first and second rotational phases, the phase difference in the other of said first and second rotational phases is assumingly calculated to arithmetically obtain said phase deviation, based on the thus assumingly calculated phase difference and on the phase difference detected in the other of said first and second rotational phases.

11. A method for controlling valve timing of engine of claim 7, wherein said step of generating is constituted to vary the phase difference based on an operating amount corresponding to the target phase difference, and said step of feedback controlling is effected to obtain an actual value of said operating amount based on the corrected phase difference corrected by said phase deviation, such that this actual value becomes said operating amount corresponding to the target phase difference.

12. A method for controlling valve timing of engine of claim 7, further comprising the step of:

inhibiting an updating calculation of the phase deviation when a variance rate of the phase difference has exceeded an allowable limit.

* * * * *